Figure 1:
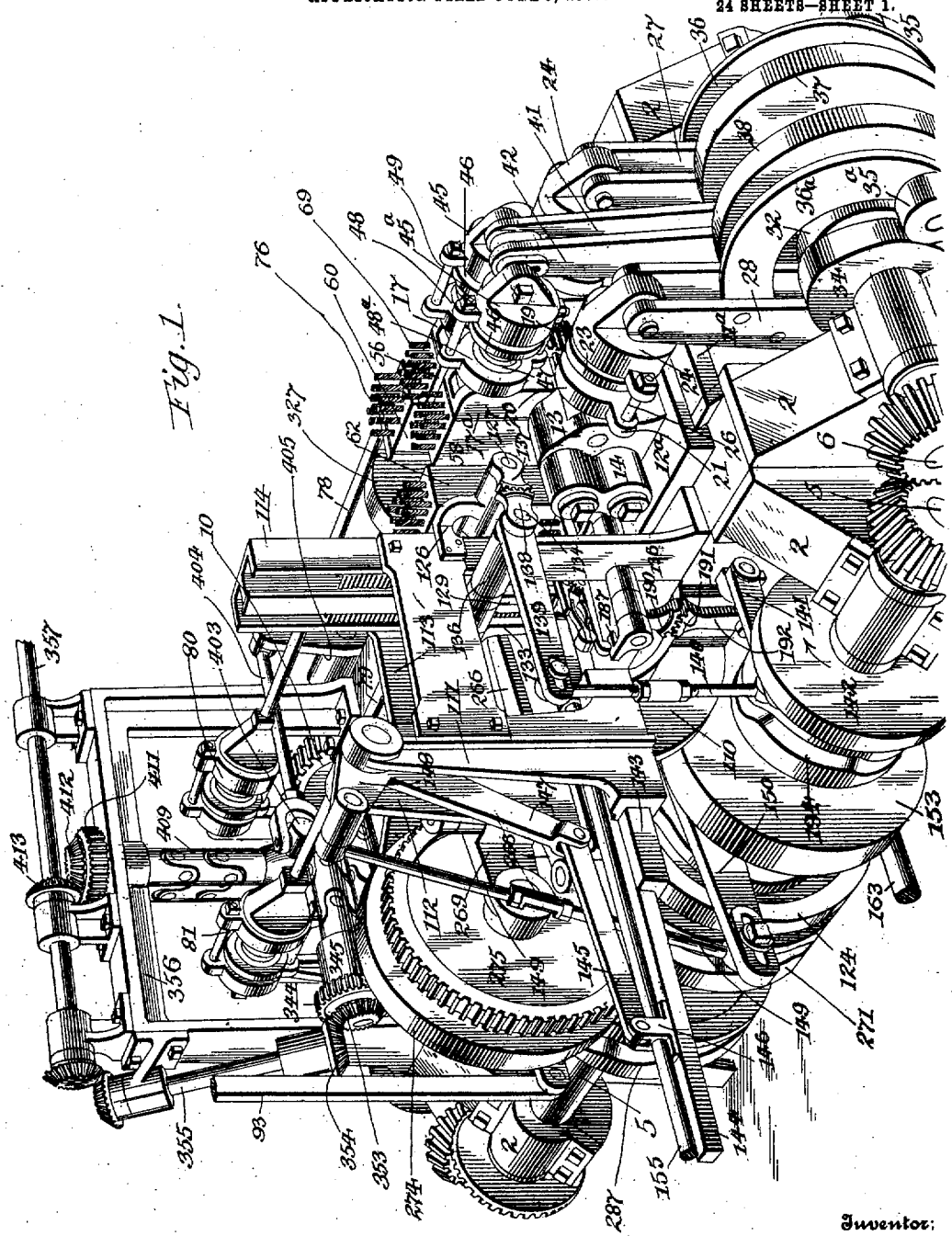

No. 861,394. PATENTED JULY 30, 1907.
H. ROBINSON.
ELECTRIC CHAIN WELDING MACHINE.
APPLICATION FILED JUNE 9, 1906.
24 SHEETS—SHEET 2.

Inventor:
Hanson Robinson,
By Dodge and Sons,
Attorneys

Witnesses

No. 861,394. PATENTED JULY 30, 1907.
H. ROBINSON.
ELECTRIC CHAIN WELDING MACHINE.
APPLICATION FILED JUNE 9, 1906.

24 SHEETS—SHEET 3.

Witnesses

Inventor
Hanson Robinson
By Dodge and Sons,
Attorneys

No. 861,394. PATENTED JULY 30, 1907.
H. ROBINSON.
ELECTRIC CHAIN WELDING MACHINE.
APPLICATION FILED JUNE 9, 1906.
24 SHEETS—SHEET 4.
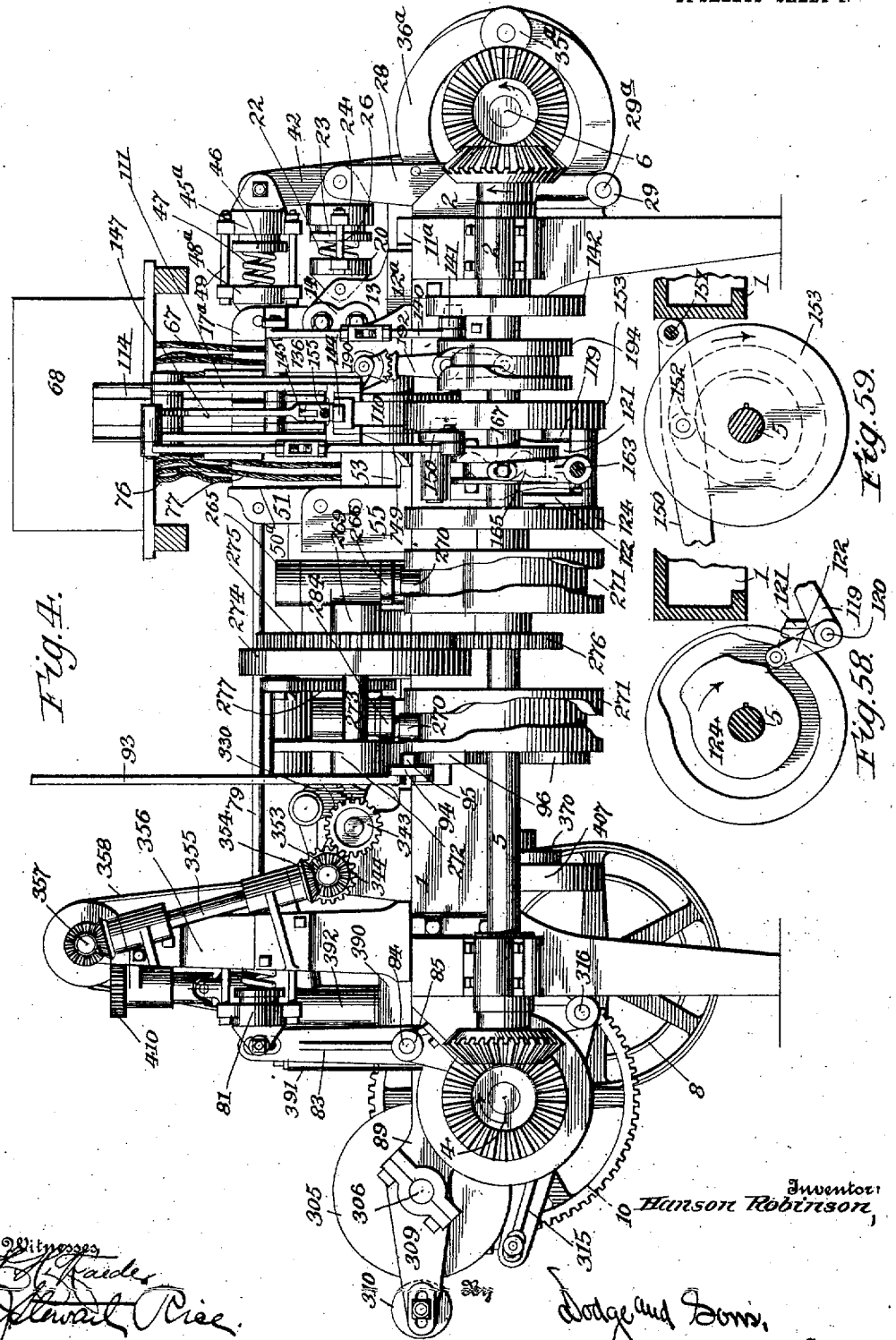

No. 861,394. PATENTED JULY 30, 1907.
H. ROBINSON.
ELECTRIC CHAIN WELDING MACHINE.
APPLICATION FILED JUNE 9, 1906.
24 SHEETS—SHEET 5.
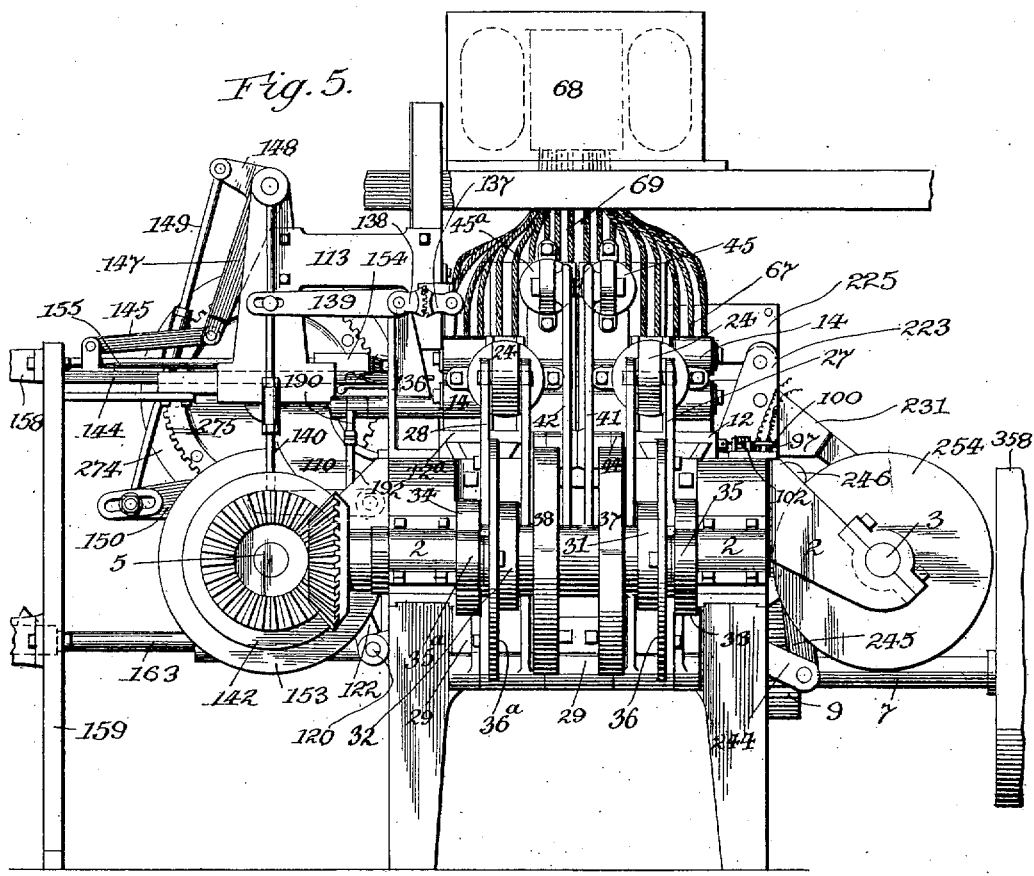
Inventor:
Hanson Robinson,
Witnesses
By
Attorneys

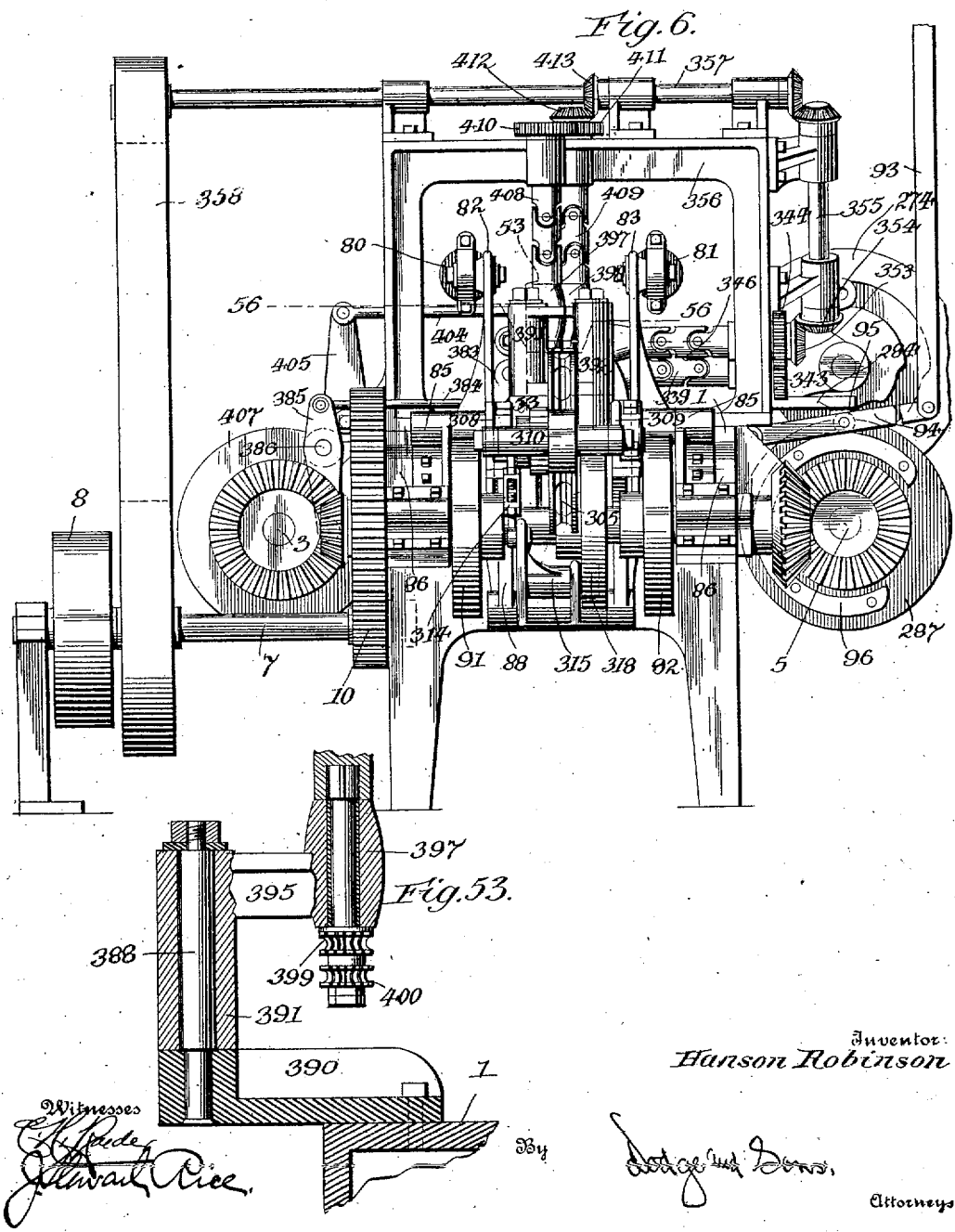

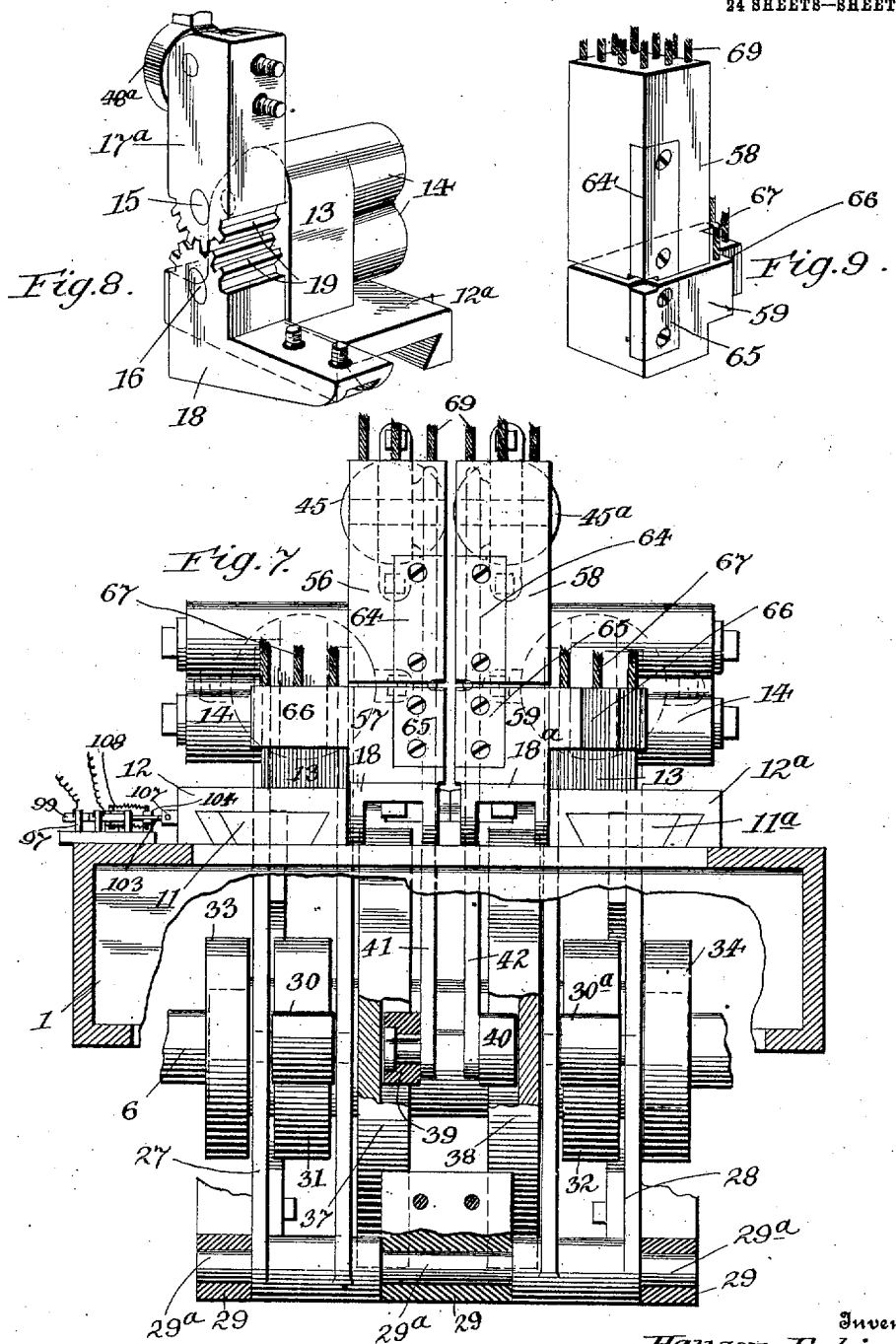

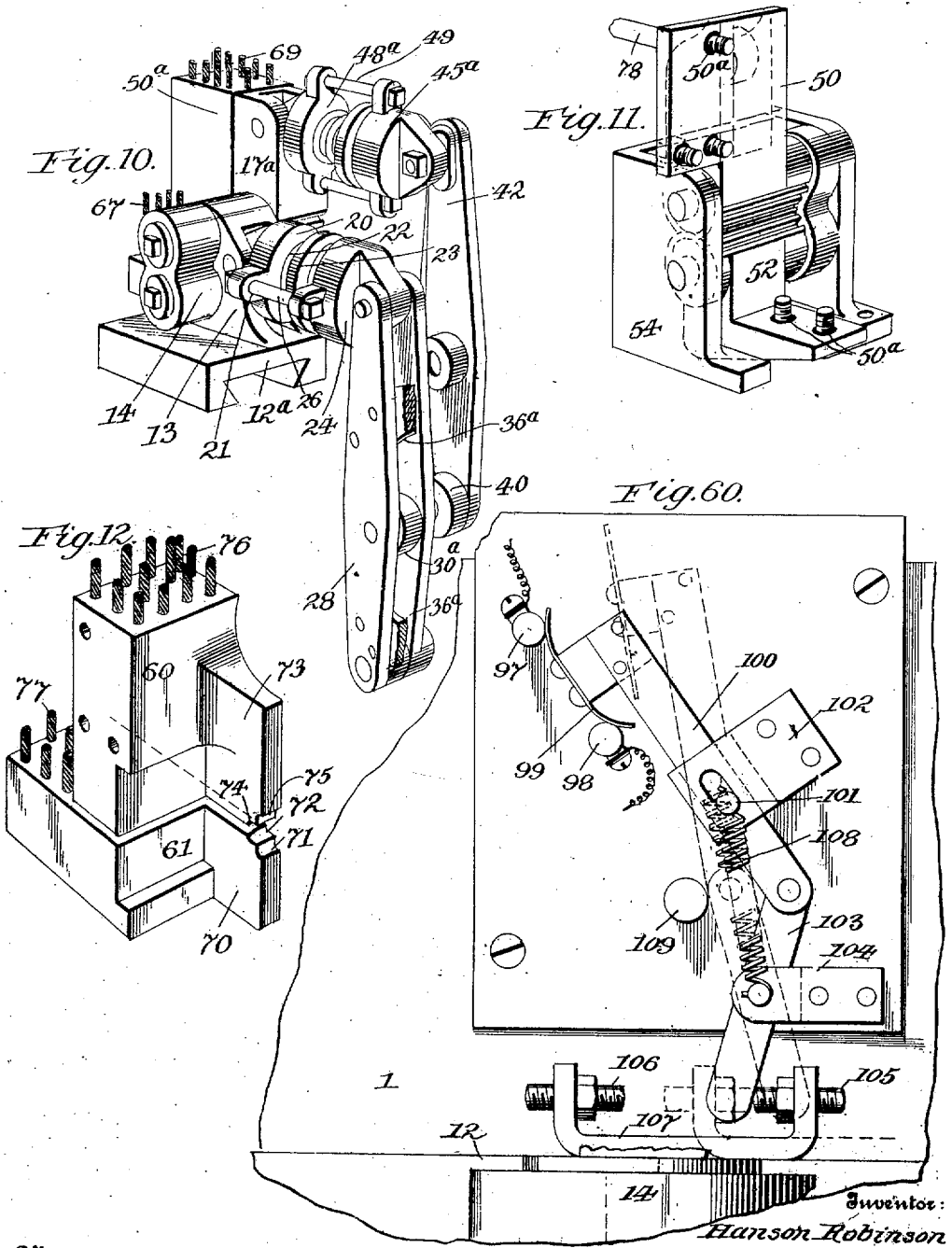

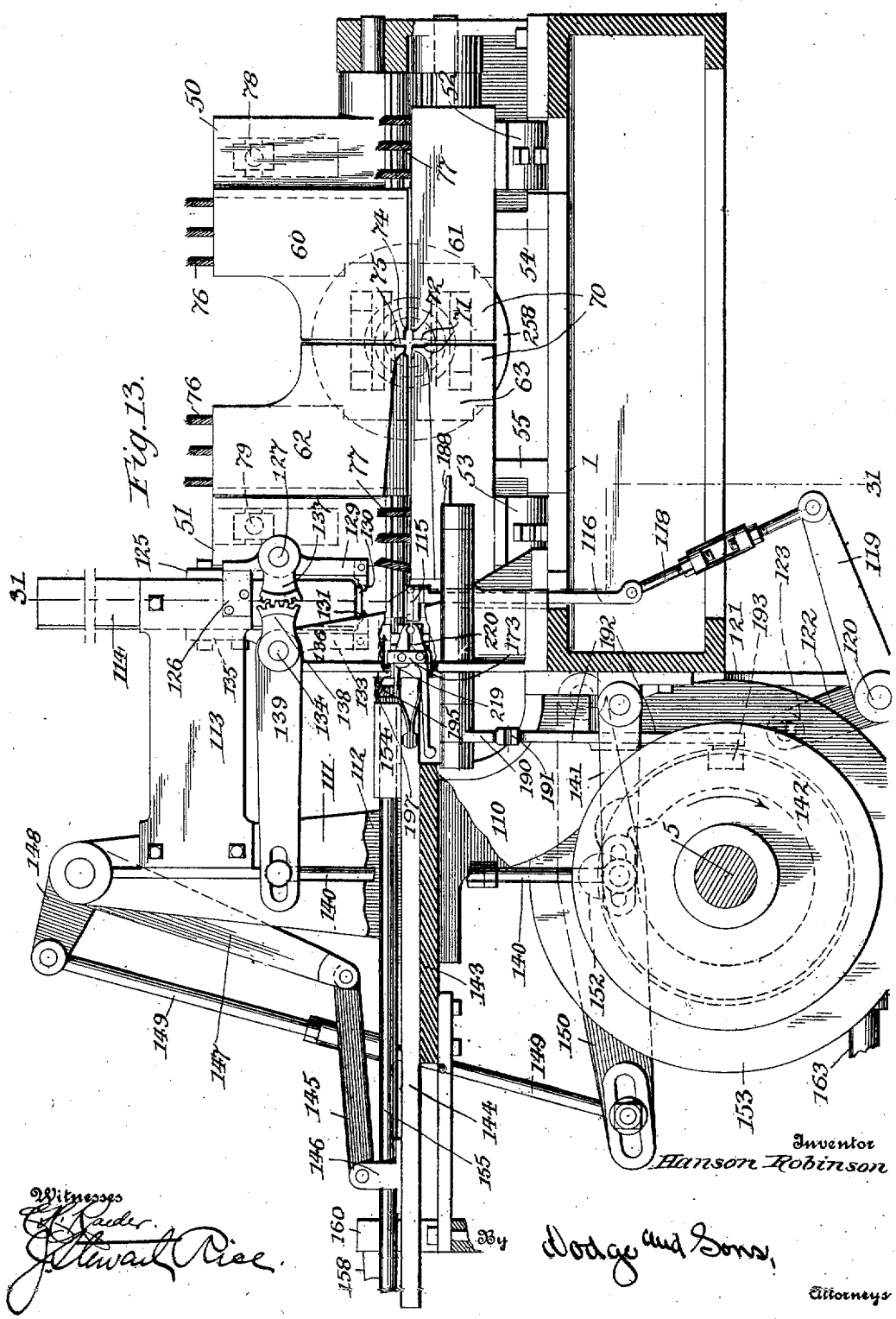

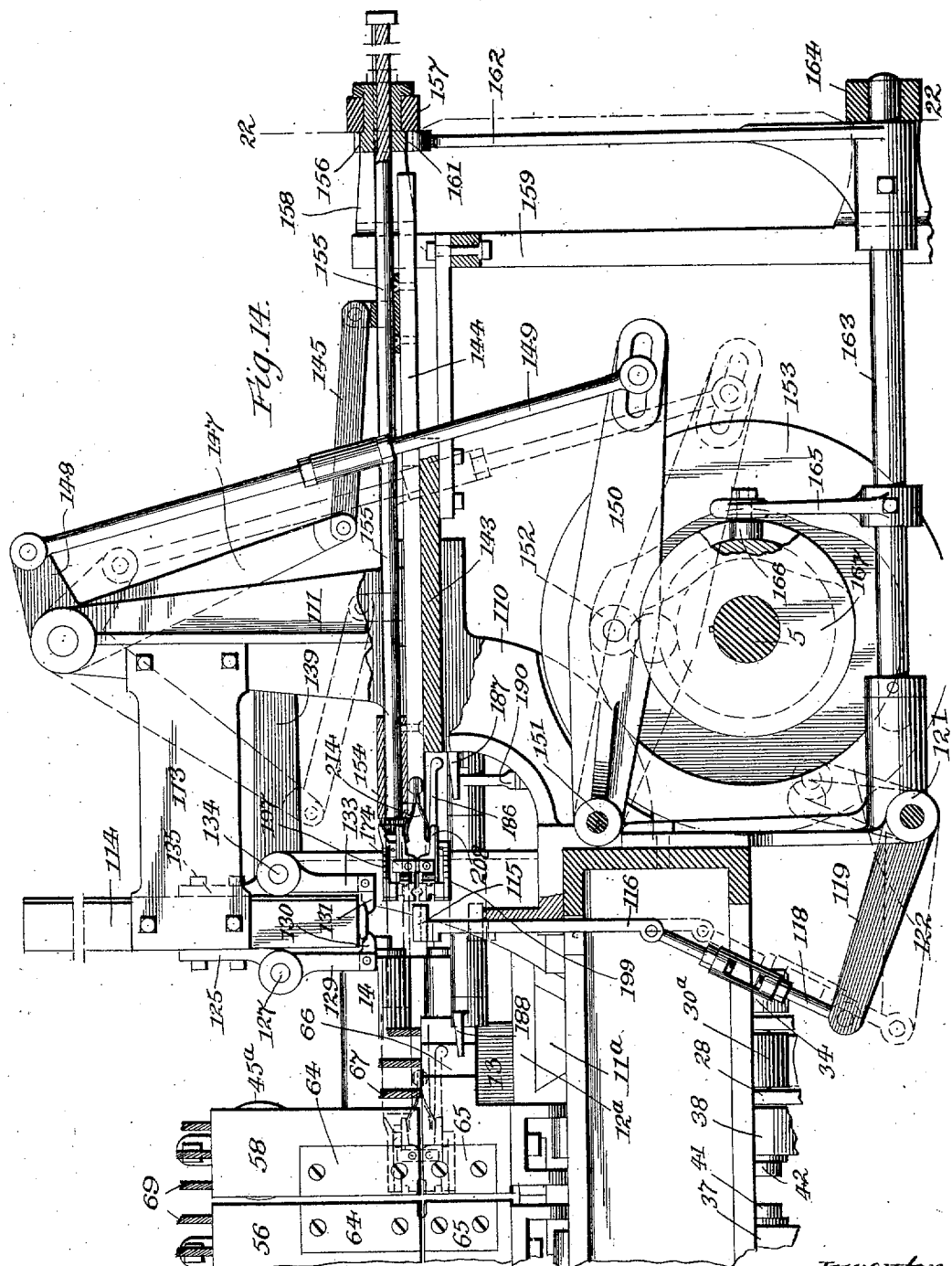

No. 861,394. PATENTED JULY 30, 1907.
H. ROBINSON.
ELECTRIC CHAIN WELDING MACHINE.
APPLICATION FILED JUNE 9, 1906.
24 SHEETS—SHEET 11.
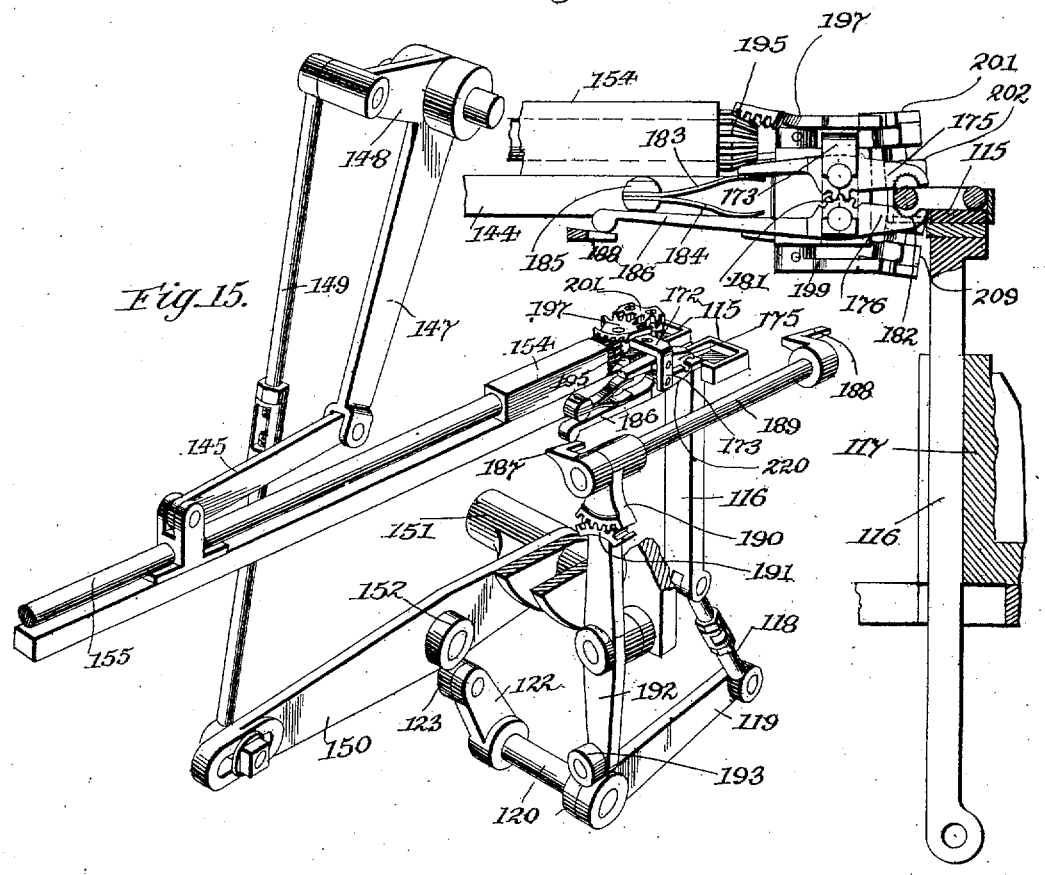
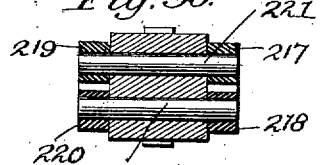
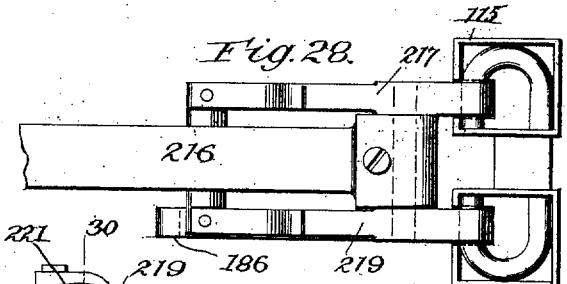
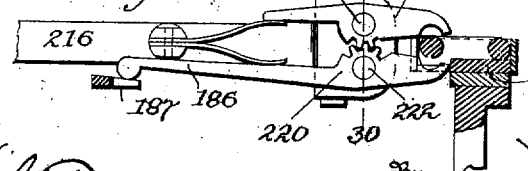
Inventor: Hanson Robinson,
By Dodge and Sons,
Attorneys
Witnesses No. 861,394. PATENTED JULY 30, 1907.
H. ROBINSON.
ELECTRIC CHAIN WELDING MACHINE.
APPLICATION FILED JUNE 9, 1906.
24 SHEETS—SHEET 12.
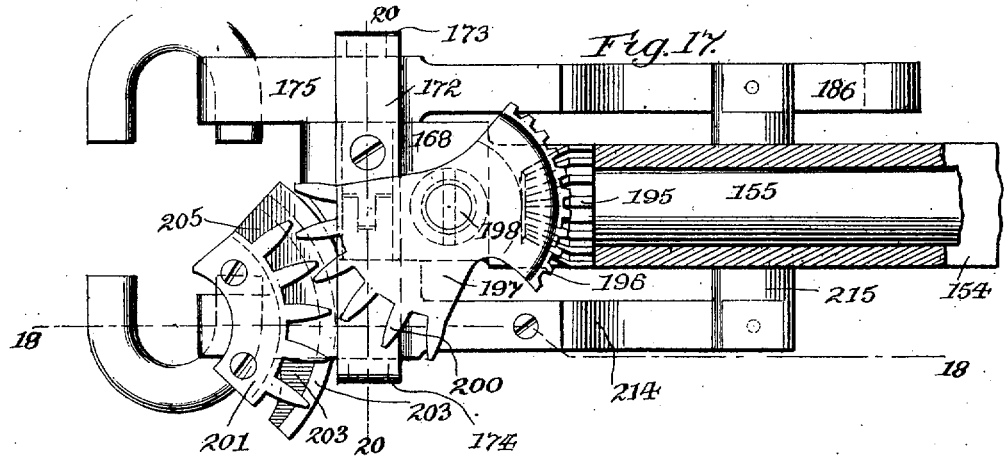
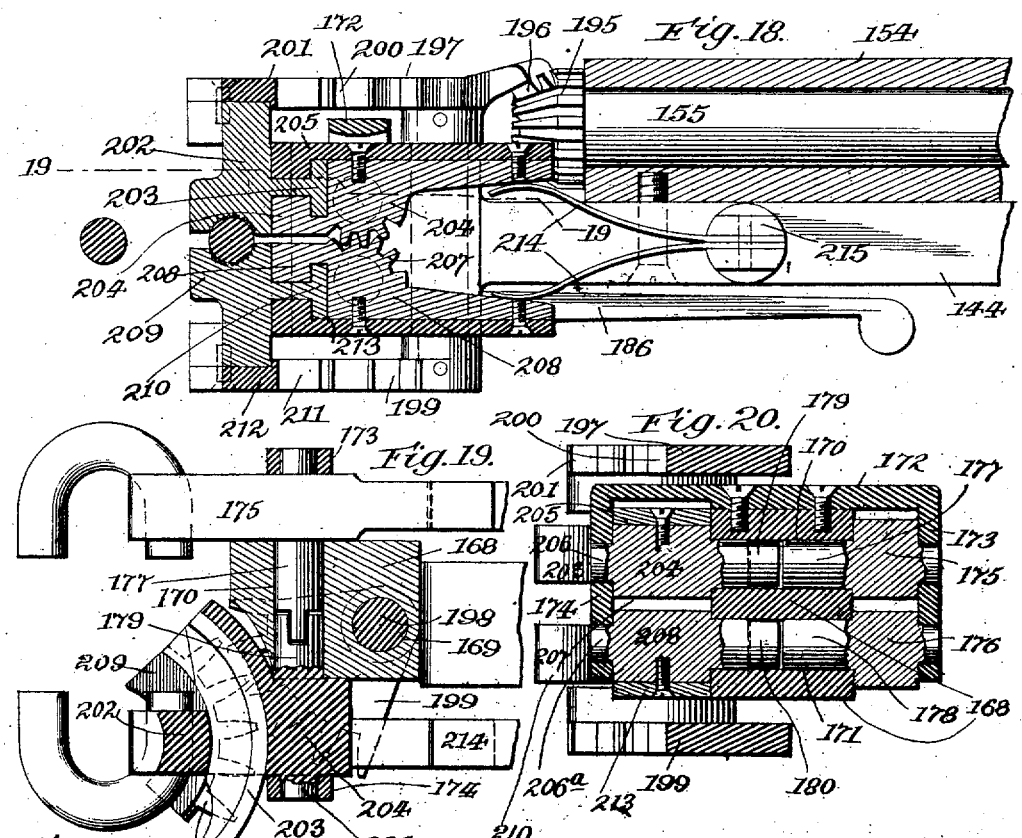
Witnesses:
Inventor
Hanson Robinson,
By Dodge and Sons,
Attorneys.

No. 861,394.  
PATENTED JULY 30, 1907.
H. ROBINSON.  
ELECTRIC CHAIN WELDING MACHINE.  
APPLICATION FILED JUNE 9, 1906.
24 SHEETS—SHEET 13.
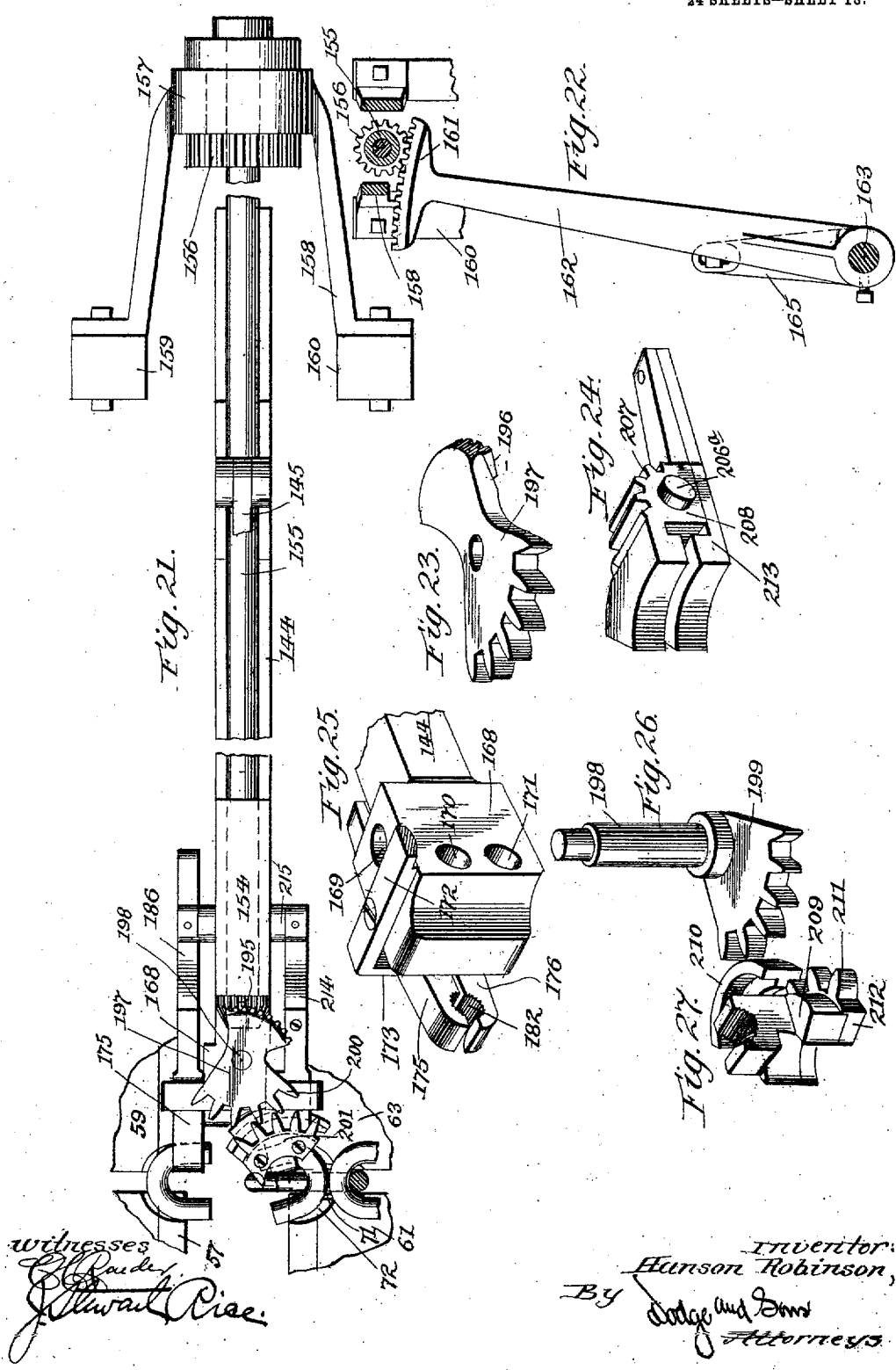
Witnesses  
Inventor: Hanson Robinson,  
By Dodge and Sons  
Attorneys

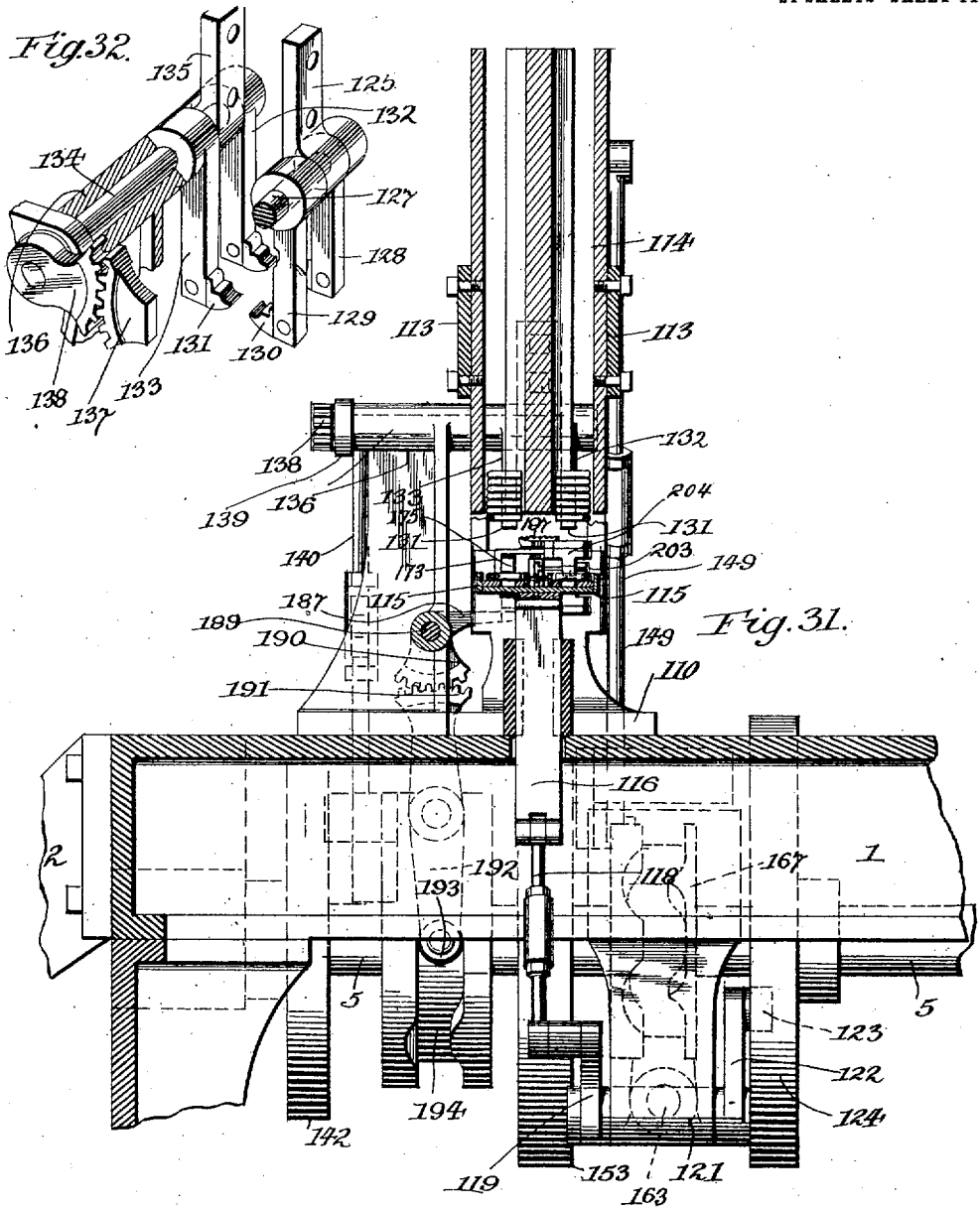

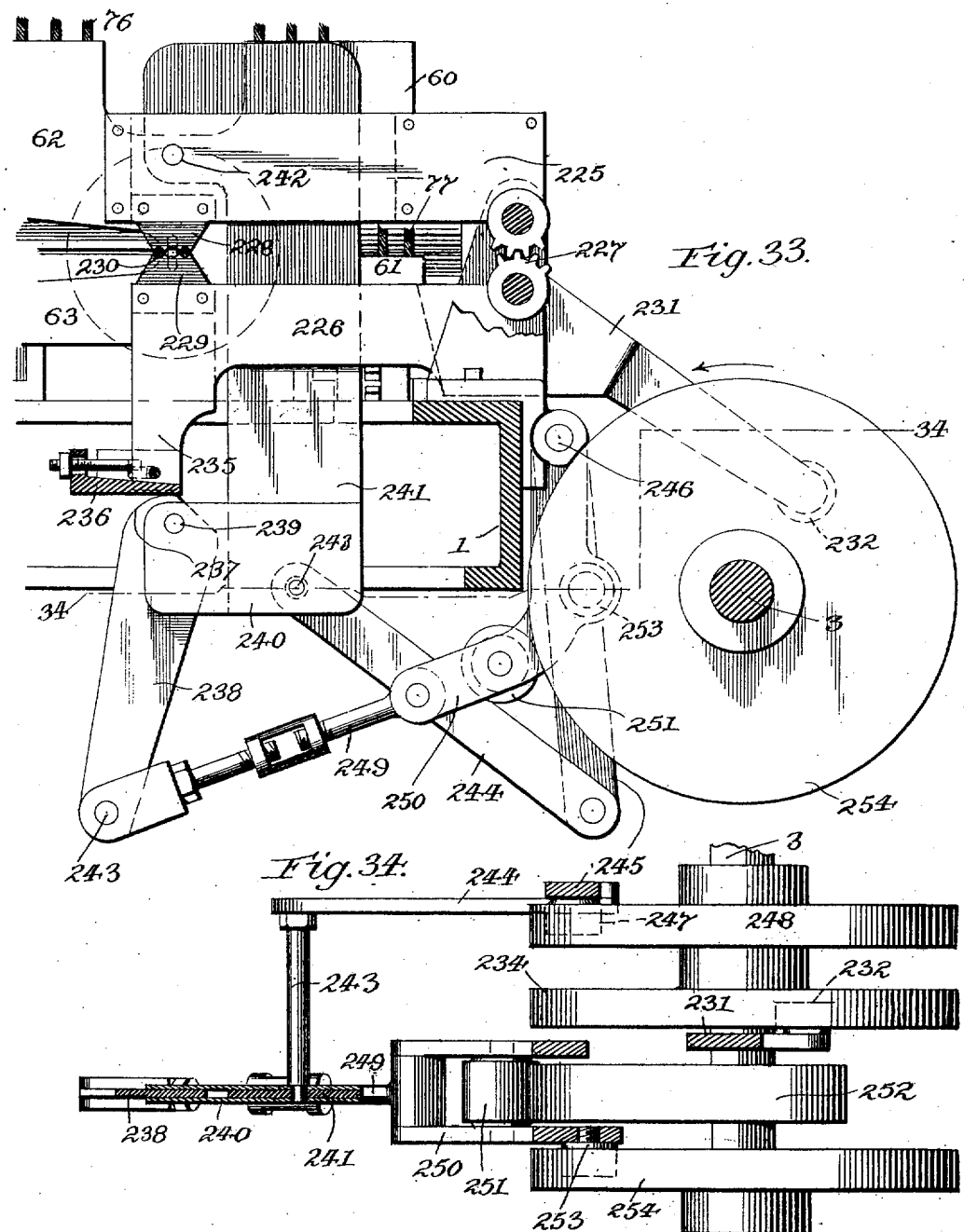

No. 861,394. PATENTED JULY 30, 1907.
H. ROBINSON.
ELECTRIC CHAIN WELDING MACHINE.
APPLICATION FILED JUNE 9, 1906.
24 SHEETS—SHEET 16.
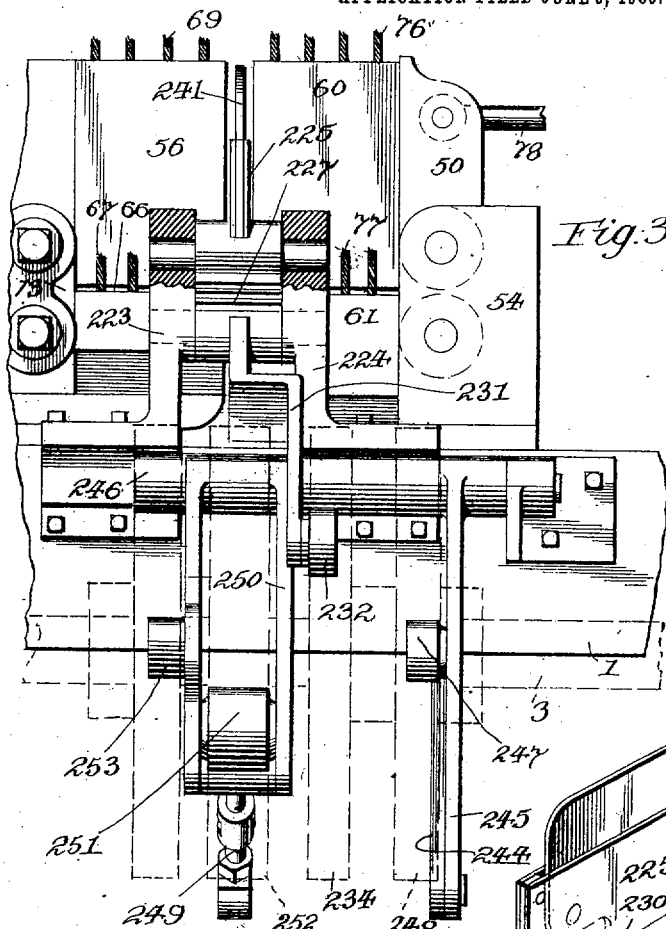
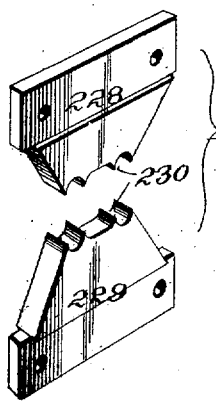
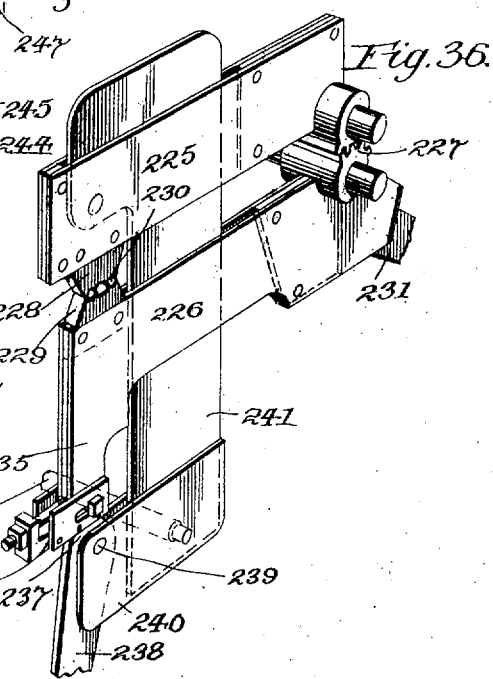
Witnesses
Inventor:
Hanson Robinson,
By Dodge and Sons,
Attorneys No. 861,394. PATENTED JULY 30, 1907.
H. ROBINSON.
ELECTRIC CHAIN WELDING MACHINE.
APPLICATION FILED JUNE 9, 1906.
24 SHEETS—SHEET 17.
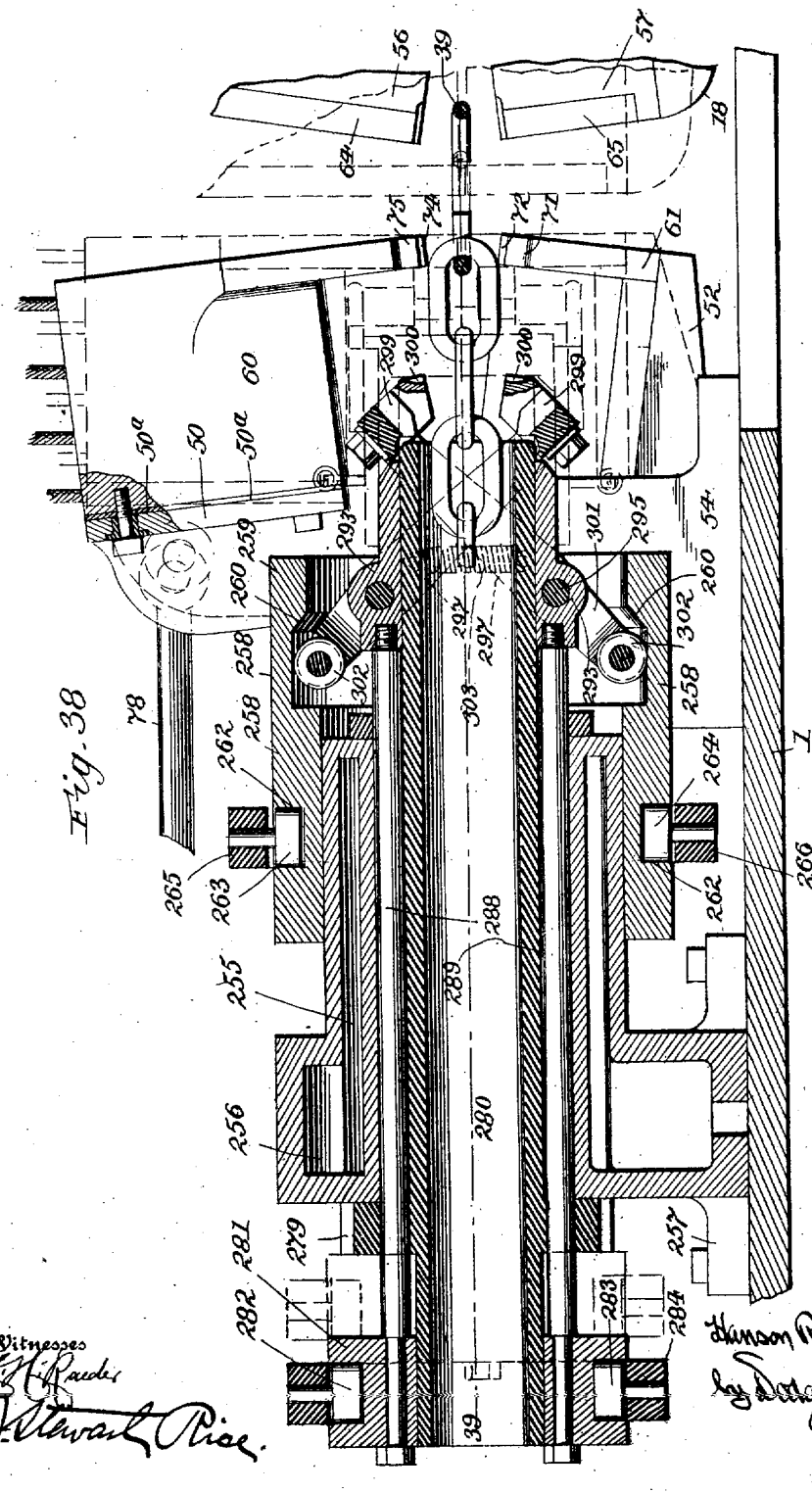

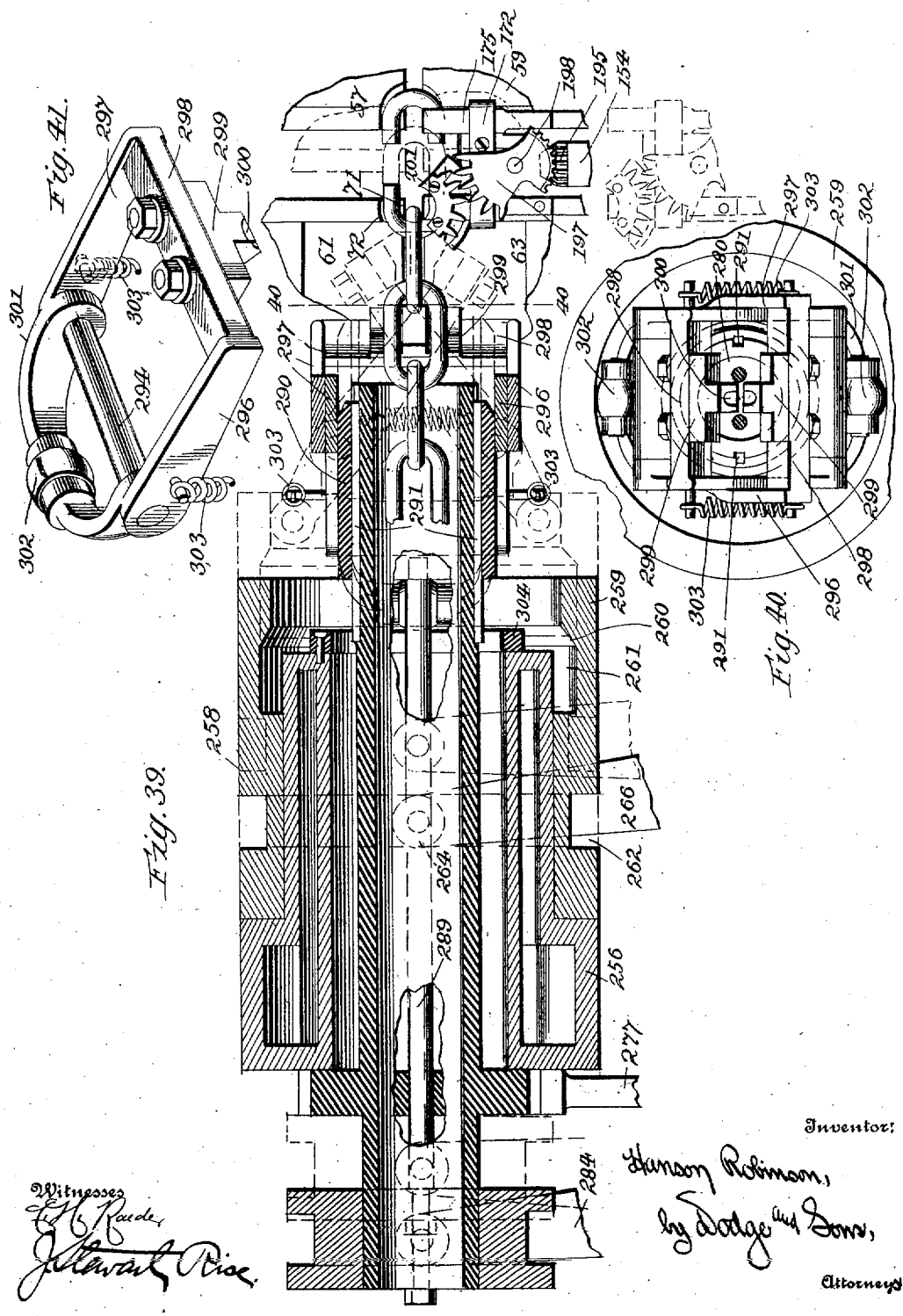

No. 861,394.  
PATENTED JULY 30, 1907.
H. ROBINSON.  
ELECTRIC CHAIN WELDING MACHINE.  
APPLICATION FILED JUNE 9, 1906.
24 SHEETS—SHEET 19.
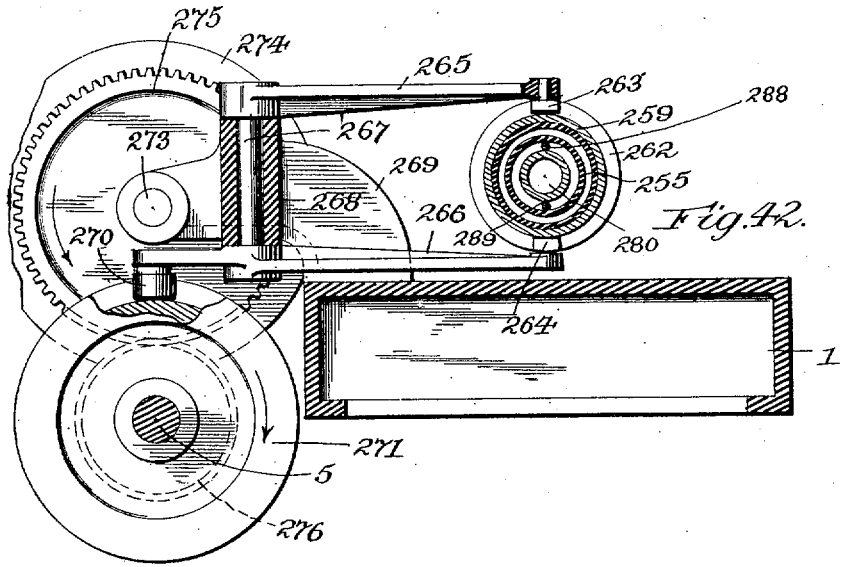
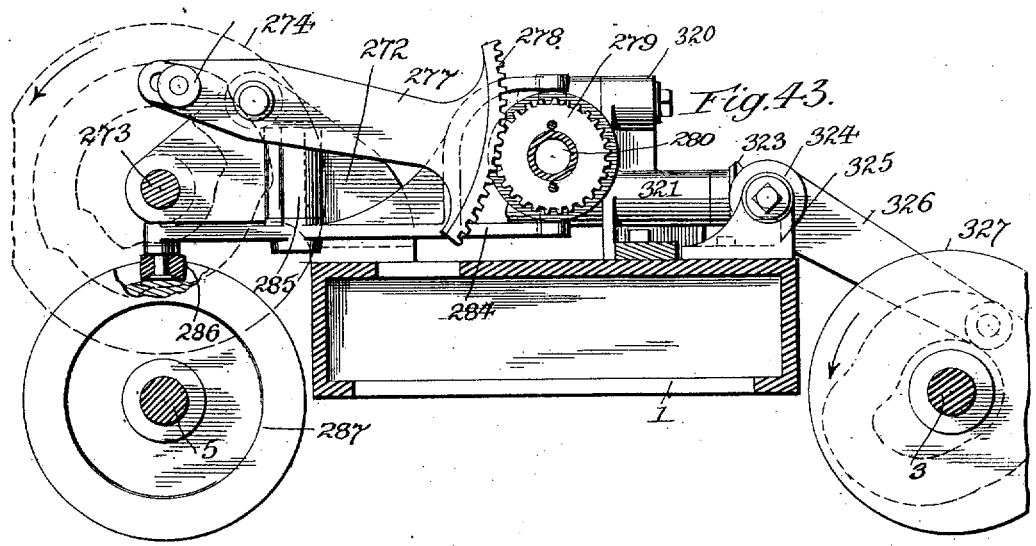
Inventor:  
Hanson Robinson,
Witnesses
By Dodge and Sons,  
Attorney

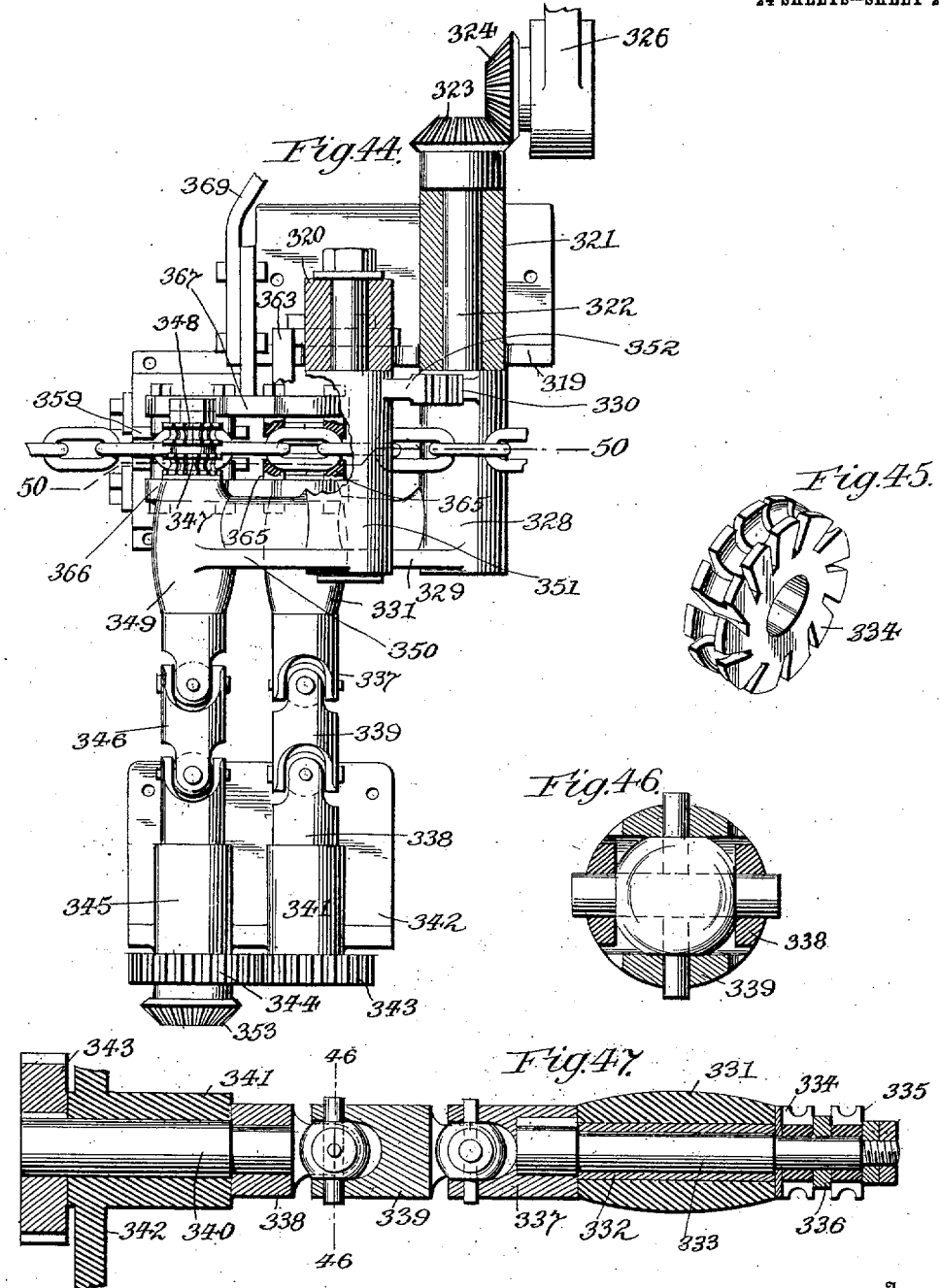

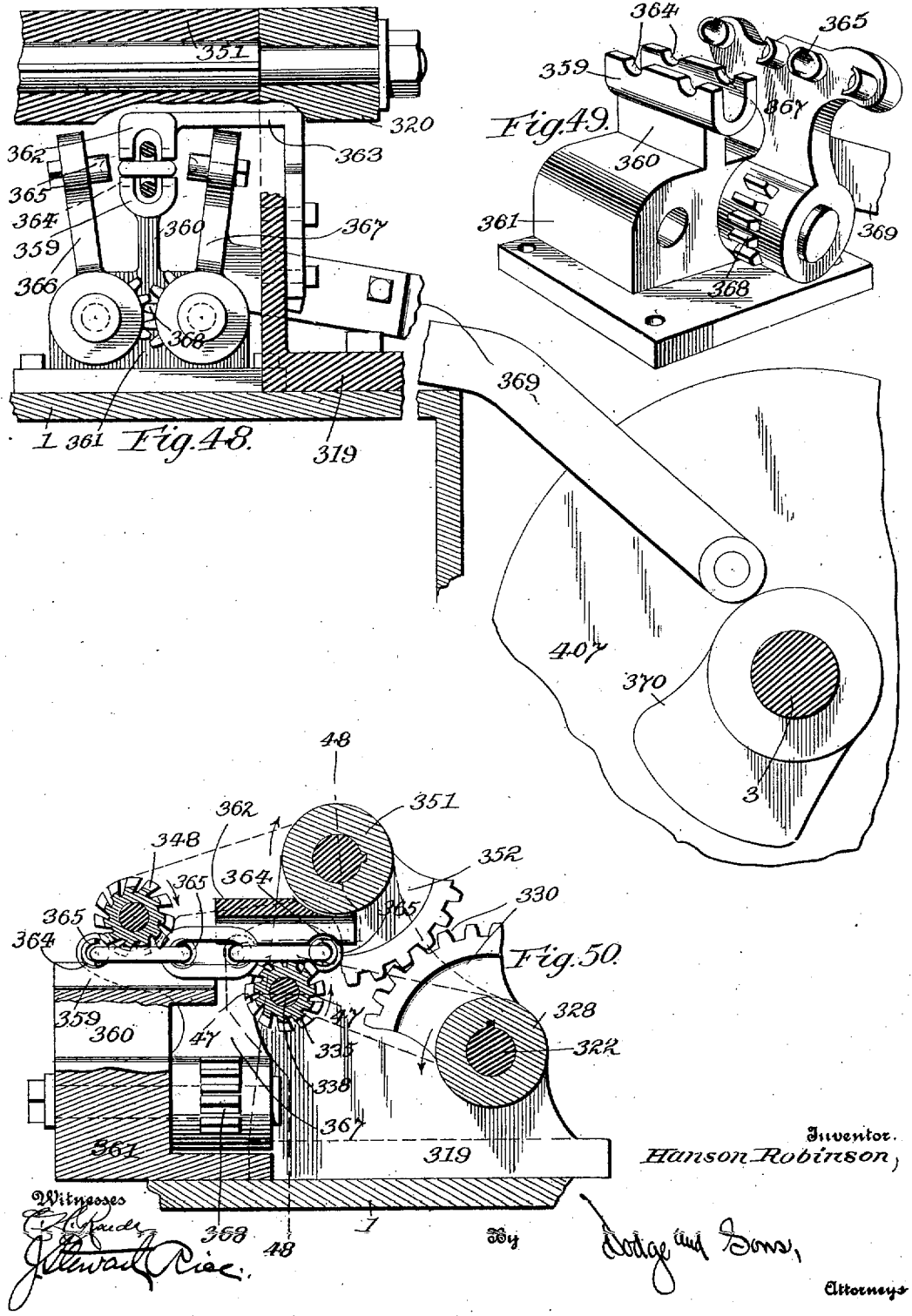

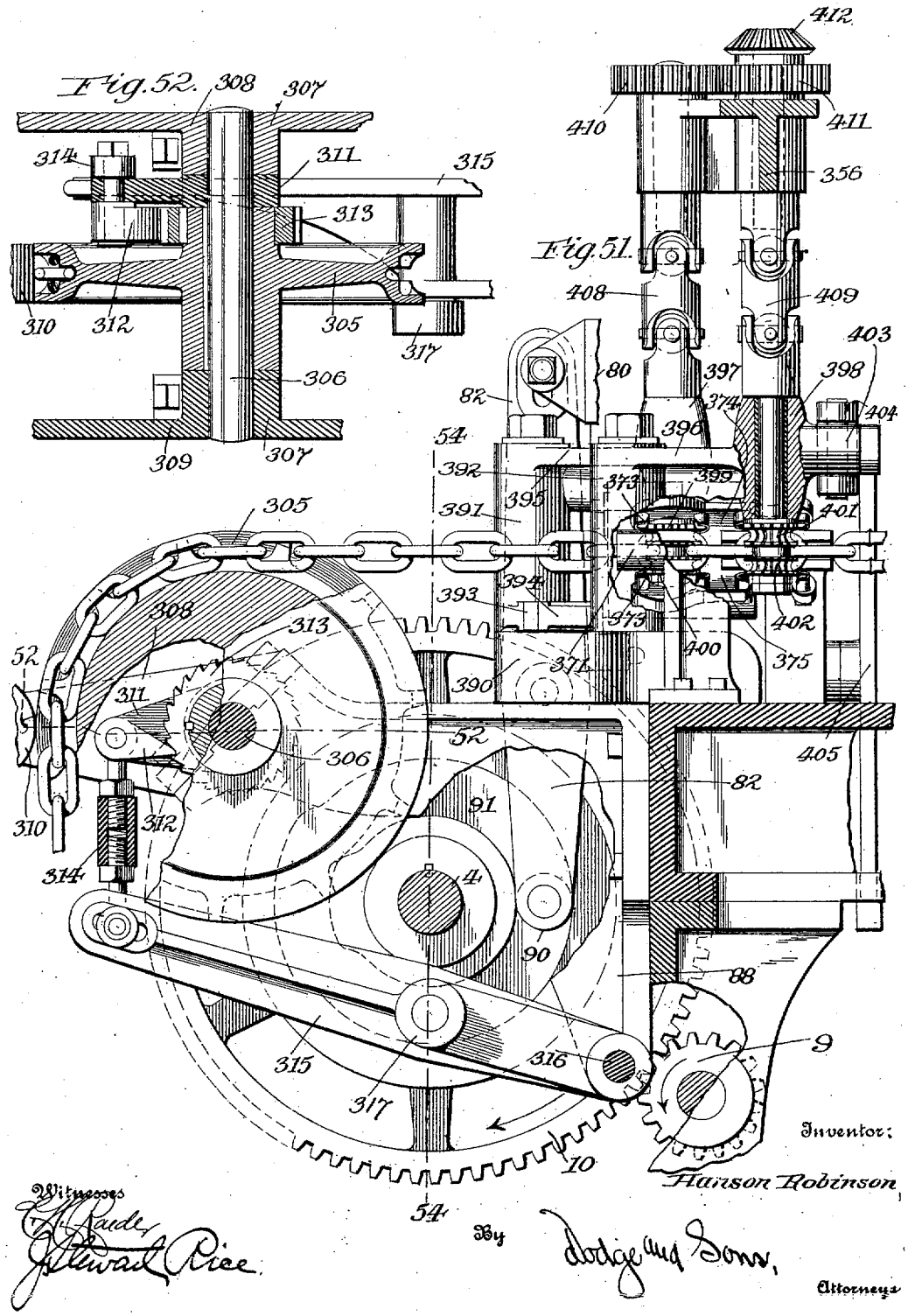

No. 861,394. PATENTED JULY 30, 1907.
H. ROBINSON.
ELECTRIC CHAIN WELDING MACHINE.
APPLICATION FILED JUNE 9, 1906.

24 SHEETS—SHEET 23.

Inventor
Hanson Robinson

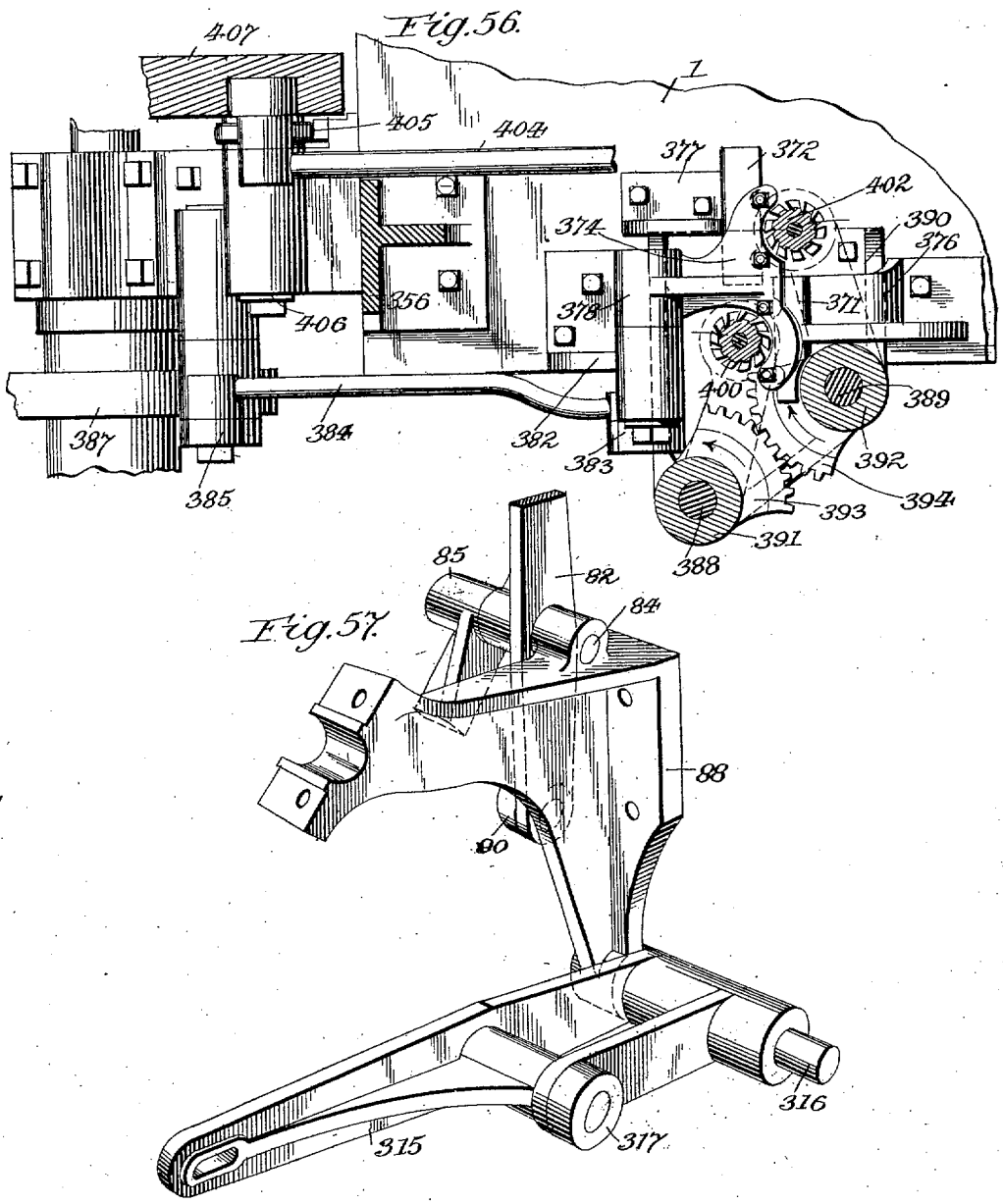

UNITED STATES PATENT OFFICE.

HANSON ROBINSON, OF HANOVER, PENNSYLVANIA, ASSIGNOR, BY DIRECT AND MESNE ASSIGNMENTS, TO AMERICAN ELECTRIC CHAIN COMPANY, OF NEWARK, NEW JERSEY, A CORPORATION OF NEW JERSEY.

ELECTRIC CHAIN-WELDING MACHINE.

No. 861,394.  Specification of Letters Patent.  Patented July 30, 1907.

Application filed June 9, 1906. Serial No. 321,045.

*To all whom it may concern:*

Be it known that I, HANSON ROBINSON, a citizen of the United States, residing at Hanover, in the county of York and State of Pennsylvania, have invented certain new and useful Improvements in Electric Chain-Welding Machines, of which the following is a specification.

My present invention pertains to an improved electric chain-welding machine, the main object of the invention being the construction of a machine which shall produce a chain in which the component links are of uniform size, the links being thoroughly and completely welded, and likewise finished at the points of welding.

Figure 2:
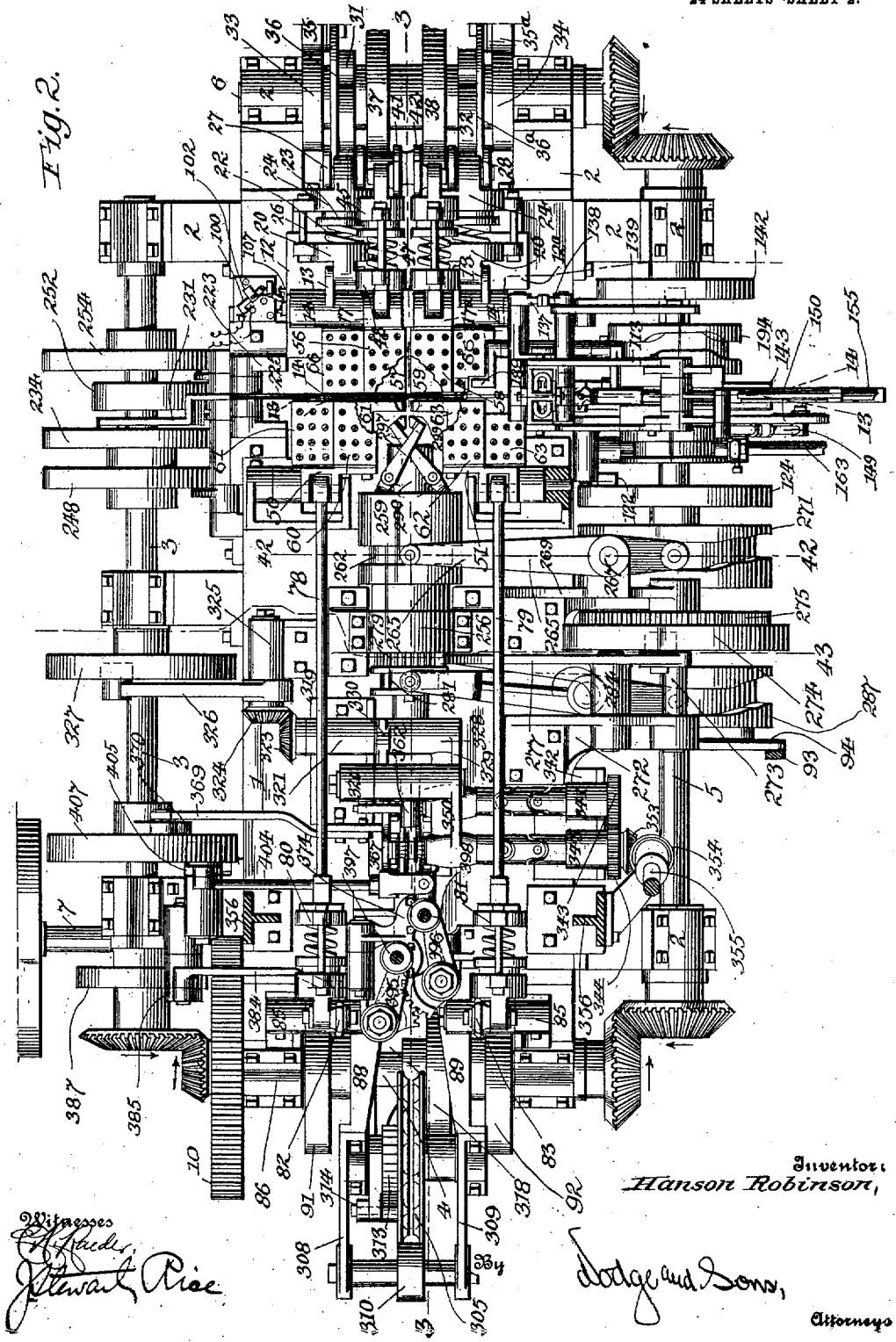
Figure 3:
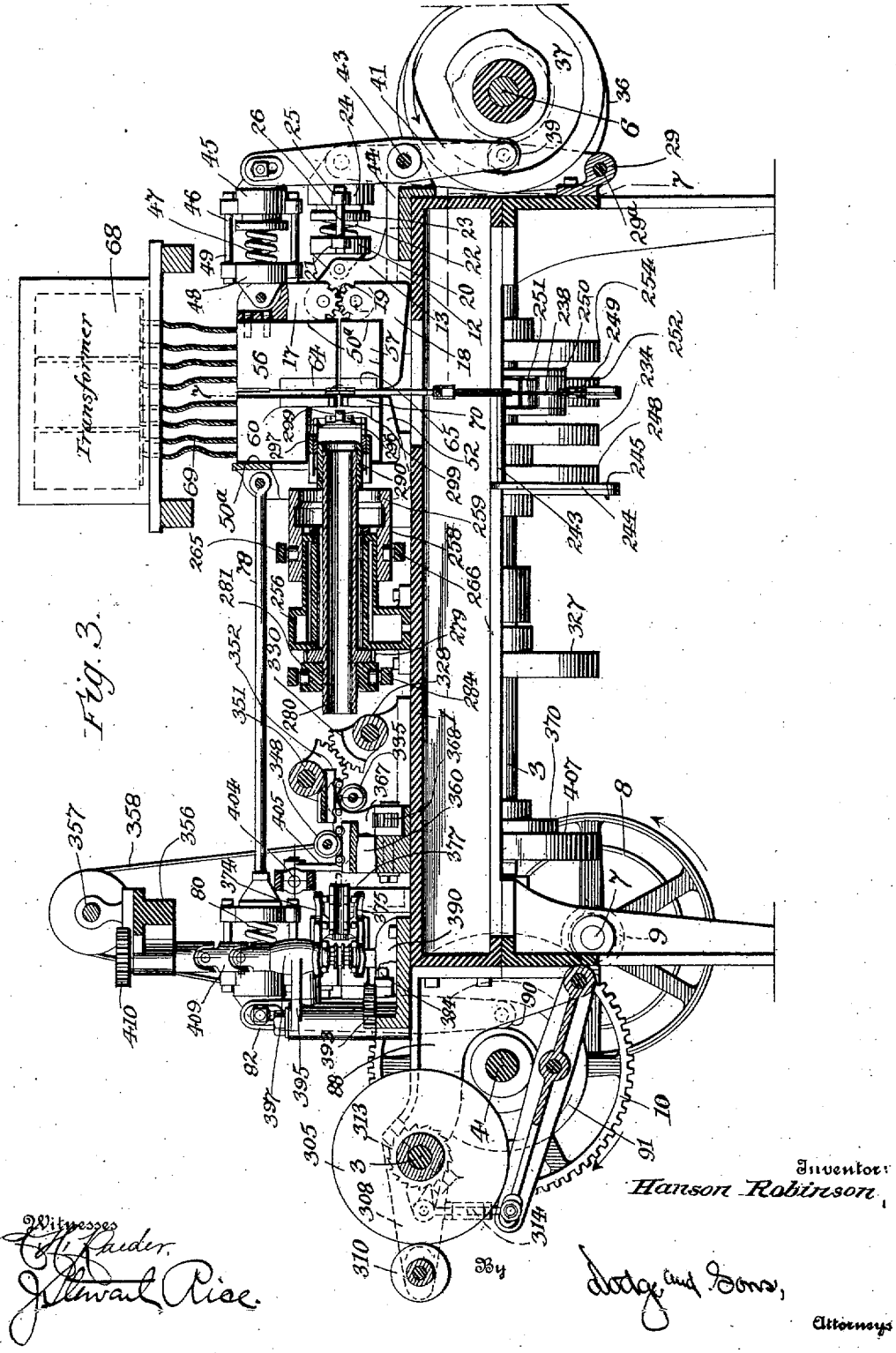

Further objects of the invention are, in part, as follows: The production of an improved means for feeding the half-links to the clamping and welding jaws, said means involving, in the preferred form, mechanism whereby one of the half-links may be threaded into the previously-formed link; the provision of eight clamping and welding jaws, two pair or sets of jaws operating upon each half-link, one pair of each set acting first to grasp its half-link, the other jaws coming into action after the link-presenter or feeder has been withdrawn; means for advancing the ends of the half-links toward each other and applying endwise pressure thereto while the welding current is caused to pass through the jaws and the abutting ends of the half-links; means for momentarily and partially releasing both of the half-links as the ends of the two halves are brought together, whereby the ends may be fairly and evenly seated prior to the passage of the welding current; means for preventing to a greater or less extent the formation of burs or swells at the points of welding, and the removal of surplus stock from the link while the metal is still hot; means for turning the last completed link to such a position that it may receive the half-link which is to be fed into the jaws and interlocked with such completed link; means for finishing the links and removing any swells, burs or enlargements; and means for withdrawing the chain, keeping that portion thereof within the machine under the desired and necessary tension, and moving the last formed link into proper position to receive the blank or half-link which is interlocked therewith. With these and other objects in view, a detail description of the machine will be given, reference being had to the annexed drawings, wherein:

Figure 1 is a perspective view of the machine, certain portions of the operative mechanism of the link-feeder being omitted; Fig. 2 a top plan view, the transformer for the current being omitted to more clearly show the clamping and welding jaws; Fig. 3 a longitudinal vertical sectional view, taken on the line 3—3 of Fig. 2; Fig. 4 a side elevation of the machine viewed from what may be termed the "feed" side, or that seen in the foreground in Fig. 1; Fig. 5 an end elevation of what may be termed the "head" of the machine; Fig. 6 a similar view of the opposite end of the machine; Fig. 7 a transverse vertical sectional view on the line 7—7 of Fig. 3, the sliding head jaws being seen in full and the apron of the table being broken away to more clearly show the cams beyond; Fig. 8 a perspective view of the jaw-carriers, and the supporting slide, the jaws being removed; Fig. 9 a similar view of a pair of jaws; Fig. 10 a perspective view of one of the jaw-slides, the jaw-carriers, the pair of jaws carried thereby, and the actuating levers for the slide and jaws; Fig. 11 a perspective view of one pair of inner jaw-carriers and their fixed support; Fig. 12 a similar view of the pair of jaws carried thereby, there being two sets of such jaws, which will hereinafter be termed the "inner" jaws to distinguish them from the jaws carried by the slide; Fig. 13 a transverse vertical sectional view on the line 13—13 of Fig. 2, looking toward the discharge end of the machine, the "inner" jaws being seen in full front elevation, and portions of the link-feeder actuating devices being broken away; Fig. 14 a similar view, taken on the line 14—14 of Fig. 2, looking toward the head of the machine; Fig. 15 a perspective view of the blank (half-links) feeding mechanism; Fig. 16 a side elevation thereof, the elevator being shown as lowered and in section, and the jaws open and about to grasp the half-links; Fig. 17 a top plan view, on an enlarged scale, of the link-feeder jaws, a pair of half-links being shown in place; Fig. 18 a longitudinal vertical sectional view on the line 18—18 of Fig. 17; Fig. 19 a horizontal sectional view on the line 19—19 of Fig. 18, the plain jaw being shown in full; Fig. 20 a transverse vertical sectional view taken on the line 20—20 of Fig. 17; Fig. 21 a top plan view of the link-feeder and its operative mechanism, the feeder being shown as threading a half-link through the previously-formed link; Fig. 22 a vertical sectional view taken on the line 22—22 of Fig. 14; Figs. 23 to 27 inclusive detail perspective views of various portions of the feeding mechanism; Fig. 28 a top plan view of a modified form of feeder which is employed when the links of the chain are sufficiently long to permit the half-links to be passed straight through without turning or threading; Fig. 29 a side elevation thereof; Fig. 30 a vertical sectional view on the line 30—30 of Fig. 29; Fig. 31 a transverse vertical sectional view on the line 31—31 of Fig. 13 illustrative of the blank or half-link magazines or chutes and the elevator or presenter which works in conjunction therewith; Fig. 32 a detail perspective view of the magazine-controlling fingers; Fig. 33 a side elevation of the swaging jaws and their attendant parts; Fig. 34 a horizontal sectional view taken on the line 34—34 of Fig. 33, the cams being shown in full; Fig. 35 an elevation of actuating mechanism for the swaging jaws; Fig. 36 a perspective view of the jaws and certain of the allied parts; Fig. 37 a similar view of the jaws alone; Fig. 38 a vertical longitudinal sectional view of the link-turning mechanism; Fig. 39 a horizontal sectional view taken on the line 39—39 of Fig. 38; Fig. 40 a vertical sectional view on the line 40—40 of Fig. 39; Fig. 41 a perspective view of one of the link-grasping jaws; Fig. 42 a transverse vertical sectional view, enlarged, taken on the line 42—42 of Fig. 2; Fig. 43 a similar view on the line 43—43 of Fig. 2; Fig. 44 a top plan view, partly in section, of the horizontally-disposed cutters; Fig. 45 a perspective view of one of the cutters; Fig. 46 a transverse sectional view on the line 46—46 of Fig. 47; Fig. 47 horizontal longitudinal sectional view of the lower cutter-carrying shaft and attendant parts, on the line 47—47 of Fig. 50; Fig. 48 a transverse vertical sectional view on the line 48—48 of Fig. 50; Fig. 49 a perspective view of the anvil for supporting the horizontally-disposed links and one of the clamping-jaws; Fig. 50 a horizontal sectional view on the line 50—50 of Fig. 44; Fig. 51 a sectional elevation showing the vertically-disposed cutters, the pocket feed wheel and attendant parts; Fig. 52 a horizontal sectional view on the line 52—52 of Fig. 51; Fig. 53 a vertical sectional view of one of the cutter supports, taken on the line 53—53 of Fig. 6; Fig. 54 a transverse vertical sectional view on the line 54—54 of Fig. 51, the cutters being omitted; Fig. 55 a sectional view on the line 55—55 of Fig. 54; Fig. 56 a horizontal sectional view, enlarged, on the line 56—56 of Fig. 6, parts being omitted; Fig. 57 a perspective view of one of the supporting brackets secured to the bed at the discharge end of the machine; Figs. 58 and 59, Sheet 4, details of certain cams; and Fig. 60 a plan view of the switch employed to complete a circuit for actuating certain devices which break the main or welding circuit.

Referring to the drawings, omitting for the present consideration of the construction shown in Figs. 28, 29 and 30, 1 denotes the bed of the machine, to which are secured suitable brackets 2 which carry shafts 3, 4, 5 and 6. A countershaft 7, driven by a belt-wheel 8, imparts motion to shaft 4, through a pinion 9, Fig. 6, and a gear 10 secured upon shaft 4. Shaft 4 in turn transmits motion to shafts 3 and 5 through suitable bevel-gears, while shaft 5 in turn drives shaft 6 through similar gearing. These shafts carry the cams which operate the various mechanisms, and inasmuch as the cams are properly timed and driven in unison the parts will all operate in the necessary sequence and order.

As above noted, there are eight clamping and welding jaws, the jaws being arranged in two series of four each, which series stand opposite to each other, while each series is composed of two pairs of jaws, there being an upper and a lower jaw in each pair, the jaws of each pair having a rocking or tilting motion toward and from each other. In addition, the outer series of jaws have a bodily facewise movement toward the inner jaws, which latter, while the half-links are being welded, are held in a fixed position. The construction of the "outer" jaws and their attendant parts will now be set forth, reference being had more particularly to Figs. 1, 2, 3 and 7 to 9 inclusive.

Secured to the upper face of the bed are suitable guides 11 and 11$^a$ upon which are mounted slides 12 and 12$^a$. Each slide is provided with an upwardly projecting column or post 13, said post having a laterally-extending portion 14, in which are formed bearings for the supporting shafts 15 and 16 of the upper and lower jaw-carriers 17 and 18, and 17$^a$ and 18$^a$. The adjacent ends of said carriers, see Figs. 3 and 8, are formed with intermeshing gear teeth 19, so that motion imparted to one carrier will be transmitted to the other and the carriers and their jaws of each pair will swing or rock toward and from each other in unison.

Pivotally secured to the rear face of each of the posts 13 is a block 20 provided with laterally-extending ears 21. Within this block is seated one end of a heavy spring 22, its opposite end projecting into an adjusting bushing 23 carried by a block 24, which latter is provided with lateral ears 25. Tie-bolts or rods 26 secure these parts against separation, but permit the blocks to be moved toward each other to a slight extent when force is applied to block 24, as the slide is moved forward to bring the half-links into welding contact.

The slides are actuated by levers 27 and 28, the upper ends of said levers being pivotally connected to the blocks 24, one to each block. Said levers are pivotally mounted at their lower ends upon a shaft 29$^a$, see Figs. 3 and 7, which shaft is supported by brackets 29, secured to the apron of the table. The levers 27 and 28 are each composed of two members between which is mounted a roll; roll 30 of lever 27 coacting with a cam 31 mounted on shaft 6, while the roll 30$^a$ of lever 28 coacts with a cam 32. These cams serve to throw the upper ends of the levers inwardly and to thereby move the slides inwardly.

To retract the slides, the cams 33 and 34 are employed, said cams coacting with bowls 35 and 35$^a$ mounted upon curved arms 36 and 36$^a$ secured to the levers, see Figs. 1, 2 and 5.

A third pair of cams 37 and 38 is mounted on shaft 6, said cams coacting with rollers 39 and 40 mounted, respectively, upon the lower ends of levers 41 and 42 fulcrumed upon a shaft 43 carried by a bracket 44 secured to the bed, see Fig. 3. The upper ends of said levers are respectively pivotally connected to blocks 45 and 45$^a$, each of said blocks carrying a cup or bushing 46 in which is seated one end of a spring 47, the opposite end of each of the springs bearing in a block or head 48, 48$^a$. The blocks of each pair are connected by tie-rods or bolts 49 in the same manner as the blocks 20 and 24. The blocks 48 and 48$^a$ are pivotally connected to the jaw-carriers 17 and 17$^a$. The inner upper jaw-carriers are designated by 50 and 51. Each of said members is provided with teeth upon its lower end which mesh with similar teeth formed on the corresponding lower members 52 and 53. Each pair of members or carriers 50 and 52 and 51 and 53 is pivotally mounted in a support or standard 54 and 55 which are secured to the bed of the machine. The outer welding and clamping jaws which are mounted upon the jaw-carriers 17 and 18, and 17ᵃ and 18ᵃ are of the form best shown in Figs. 7 and 9. The jaws are designated by 56 and 57 for one pair, and 58, 59 for the second pair.

The "inner" clamping and welding jaws are designated as 60 and 61 for one pair, and 62, 63 as the second pair, said jaws being secured to the carriers 50 and 52, and 51 and 53. The jaws are insulated from their carriers by interposed insulating sheets 50ᵃ, and suitable insulating sleeves and washers are used in conjunction with the securing bolts or screws. The upper jaws 56 and 58 are alike and take the form best illustrated in Fig. 9. Each of said jaws is provided with a removable face-plate 64, let into the body of the jaw, said plate having a cut-away portion at its lower end which, with the similarly-formed plate 65 of the lower jaws 57 and 59, forms a seat or recess for the reception of the curved section or end of the half-link. Each of the lower jaws is provided with a lateral extension 66, to which the wires 67, leading from the transformer 68, are connected. Wires or conductors 69 connect the upper jaws 56 and 58 with the transformer. The inner jaws are of the form best shown in Figs. 2, 12 and 13. Each of the lower jaws is provided with a relatively thin extension or arm 70, having notches or recesses 71 and 72 formed in its edges immediately adjacent to the upper outer corner thereof. The upper jaws 60 and 62 are each provided with a similar extension 73, in which are formed notches or recesses 74 and 75. When the jaws are in their closed position, see Fig. 13, a cruciform opening is formed between them, which opening permits the jaws to grip the newly inserted half-link and also accommodate the link just formed or welded, see Fig. 39.

Wires or conductors 76 and 77 connect the upper and lower inner jaws with the transformer 68. Pivotally secured to the (inner) upper jaw-carriers 50 and 51 are rods 78 and 79, see Figs. 1, 2, 3, 4 and 6, each of said rods being connected to a yielding compression device or mechanism designated by 80 and 81, and similar in construction to the connecting devices interposed between the rear jaws and the carrying slides therefor, and their actuating levers, as above set forth in detail. Said yielding devices 80 and 81 are, respectively, adjustably connected to the upper ends of levers 82 and 83, each of said levers being fulcrumed at substantially its midlength upon a shaft 84, see Fig. 54. Each of said shafts finds its bearing at one end in a block 85 secured to the bearing-blocks 86 of shaft 4, and at the opposite end in a bearing 87 formed upon brackets 88 and 89, one of said brackets being shown in detail in Fig. 57. The lower end of each lever 82, 83 carries a roll 90, the rolls working in cams 91 and 92, best shown in Figs. 2, 4, 6, 51 and 54. The cams are so timed that the jaws are operated in the following manner, assuming that carriers 18 and 18ᵃ are drawn outwardly to their full extent and the jaws fully opened:

The two blanks or half-links are carried inwardly between the jaws by a mechanism to be presently described, one blank being presented to the inner jaws and the other to the outer jaws. Jaws 56 and 57 of the outer series, and jaws 60 and 61 of the inner series first close, each pair graping one of the half-links, the other two pairs of jaws remaining open to allow the blank-presenting mechanism to release its grasp upon the half-links and to recede to a point remote from the jaws. Jaws 58, 59 and 62, 63 are then rocked and close upon the blanks, each blank being thus held by two pairs of jaws with the ends of the U-blanks directly opposite each other. Cams 31 and 32 then come into action and through levers 27 and 28 advance the slides and with them the outer jaws to the inner jaws, thus bringing the ends of the U-shaped blanks together. Before the ends of the blanks come into this position the various jaws are separated slightly, to permit the half-links to shift a short distance if necessary in order that the ends thereof may have an equal and fair bearing, thus insuring the passage of the same amount of current through both sides. When this adjustment is effected, the jaws close down firmly on the blanks and the outer series of jaws are withdrawn to a slight extent. The current is then turned on, preferably in the manner to be described, and the cams 31 and 32 move the outer jaws inward to effect the final pressure, at which time the current will effectually weld the abutting ends of the half-links. It will thus be seen that the blanks are brought together evenly and the same pressure is exerted upon both legs of the blank, thereby insuring a weld of the same character in both joints.

When the weld is completed, the current is automatically cut off, the jaws first opened and then separated, and the completed link positioned, so that one of the U-blanks may be threaded or passed therethrough, preparatory to the formation of a new link.

*Current-controlling mechanism.*—The current which passes to the transformer and thence to the welding jaws is controlled by a switch (not shown) which is closed by a rod 93, Figs. 1, 2, 4 and 6, carried at the outer end of a lever 94, a roller 95 thereon coacting with a cam 96 to raise the rod and close the switch. The switch will be provided with a solenoid release, the solenoid being actuated or energized by a current of slight strength and independent of the welding current. Such switches are well known. The local or solenoid-energizing current leads to two terminals 97 and 98, Fig. 60, which, when the weld has reached the proper point, are bridged or closed by a plate 99 carried at the outer end of a lever 100. Said lever is fulcrumed upon a pin 101 mounted in a slotted bearing 102, the inner end of the lever being pivotally connected to a second lever 103 fulcrumed in a bracket 104. The inner free end of lever 103 stands in the path of two adjustable actuating fingers 105 and 106 carried in the ends of an elongated U-shaped bracket 107 secured to the slide 12.

Levers 100 and 103 form a toggle intermediate their fulcrums, and a spring 108 secured at one end to pin 101 serves to hold the toggle to one or the other side of a line passing through the fulcrum points. A stop 109 prevents the spring from throwing the toggle too far in one direction. The action of the switch is as follows: Assuming that the parts are in the positions shown in dotted lines and the two half-links have been properly positioned in the welding jaws, the solenoid energizing current will remain broken until finger 105 comes into contact with lever 103 as slide 12 advances, and is moved to such an extent that spring 108 will throw the toggle and carry plate 99 into contact with terminals 97 and 98. Finger 105 is so adjusted as to cause this movement to take place when the slides 12 and 12ª have moved sufficiently far to effect a proper union between the abutting molten ends of the blanks. Immediately the circuit is closed by plate 99, the solenoid is energized and the main switch opened, thereby cutting off the flow of current to the transformer and to the welding jaws. Finger 106 will, upon the rearward movement of slide 12, throw the toggle to the opposite side and open the circuit. As the slide moves rearwardly, rod 93 will be lowered by cam 96, preparatory to again being raised to close the main circuit. By the use of the mechanism shown in Fig. 60 the current may be cut off at any desired time, a point of manifest advantage, as links of different sizes require the passage of the welding current for greater or less periods.

*Blank feeding and presenting mechanism.*—The preferred form of this mechanism is illustrated in Figs. 1, 2, 4, 5, 13 to 27 inclusive, 32 and 33.

Secured to the bed 1 and extending outwardly and upwardly therefrom is a bracket 110 (Figs. 1, 13 and 14) surmounted at its upper end by two vertically-disposed, slightly separated posts or columns 111 and 112. Secured to said posts and extending inwardly over the bed to a slight extent are arms 113, to which in turn is secured the double column or channel magazine 114, adapted to hold two series of U-shaped blanks, see Fig. 31. A blank or half-link is discharged from the lower end of each column simultaneously, onto an intermittently rising and falling table or platform arranged immediately below the magazine. Said table is composed of two pocket-like receptacles 115, closed on three sides but open at the outer side, see Fig. 16, to permit the entrance of the jaws of the carrying or transferring mechanism. The table is mounted on the upper end of a rod 116 which is slidably supported in a bearing 117, Figs. 14 and 16, the lower end of the rod being pivotally connected to an adjustable link 118. Said link in turn is connected to a lever 119 secured to one end of a rocker-shaft 120, which is mounted in a bracket 121, Figs. 14, 31 and 58, secured to the bed. To the opposite end of the shaft is secured an arm 122 carrying a roll 123, which works in a cam groove formed in a cam 124 mounted upon shaft 5.

Secured to the inner face of the magazine and one of the arms 113 are hangers 125 and 126, see Figs. 1, 2, 13 and 32, in which is mounted a shaft 127, having secured thereto downwardly-projecting arms 128, 129, each arm being provided with a stepped finger 130, said fingers extending inwardly beneath the magazine columns and the blanks therein. Fingers 130 coöperate with similar fingers 131 secured to arms 132, 133 carried by a shaft 134. Said shaft is carried in a hanger 135 and also in a bearing formed in the upper end of a post or column 136, Figs. 13, 14 and 31.

Secured to one end of shaft 127 is a sector gear 137 which meshes with a similar gear 138 carried by shaft 134. Shaft 134 has also secured to it a lever 139, the outer end of which is slotted and has connected thereto an adjustable link 140, the lower end of which is pivotally connected to the outer end of a radius bar 141, the inner end of said bar being pivotally connected to a bracket secured to the bed. A roller, see dotted lines Fig. 2, carried by the bar, coacts with a cam 142 secured upon shaft 5. Rotation of cam 142 causes a rise and fall of link or pitman 140 and a consequent rocking of lever 139 and shaft 134. Oscillating movement of shaft 134 will be imparted to shaft 127 through gears 137 and 138 and as a consequence the fingers 130 and 131 will be moved toward and from each other. The opening movement takes place when the table or receptacles 115 are in their highest positions, so that a pair of half-links, one from each column, may pass down into the receptacles. The fingers are then immediately closed and so remain until the table is lowered and again raised.

Secured upon the bracket 110 intermediate the columns 111 and 112 is a slideway 143 in which is mounted a slide 144. A link 145 is pivotally connected to a lug 146 extending upward from the slide, the opposite end of the link being connected to the long arm 147 of an elbow-lever fulcrumed upon a shaft passed through the upper ends of the columns 111 and 112. The short end 148 of the lever is connected by an adjustable link 149 with the outer end of a lever 150, said lever being fulcrumed at 151 (Fig. 14) at its inner end and carrying a roller 152 (Fig. 15) which coacts with a cam 153, said cam being shown in detail in Fig. 59.

Slide 144 at its inner end is provided with an enlargement 154 in which is journaled a shaft 155, which extends beyond the outer end of the slide, Fig. 14, and passes through a gear 156, the hub 157 of which is rotatably mounted in a U-shaped bracket 158, Figs. 21 and 22, secured at its ends to uprights 159 and 160.

Gear 156 is provided with a spline or feather, Figs. 14 and 22, which takes in a long spline-way formed in the shaft, so that the shaft at all times partakes of the oscillating movement of the gear, but may be moved endwise therethrough. Oscillating movement is imparted to gear 156 by a sector rack 161, formed upon the upper end of an arm 162, secured upon a shaft 163, said shaft being journaled in a cross-bar 164, Fig. 14, secured between the uprights 159 and 160, and in the bracket 121. A second arm 165 is secured to the shaft and a roller 166, carried thereby, coacts with a cam 167 mounted upon shaft 5.

Secured to the inner end of slide 144 is a head 168, provided with a vertically-disposed opening 169 and with two horizontal openings 170 and 171, see Fig. 25. This head is designed to carry the pincers which grasp the two half-links lying in the receptacles 115 and to carry them to the clamping and welding jaws. These parts in their preferred form are best illustrated in Figs. 15 to 21 inclusive and Figs. 23 to 27 inclusive.

Secured to the upper face of the head is a bar 172 having downwardly-projecting arms 173 and 174, Fig. 20, said arms being provided with openings in line with the openings 170 and 171. A pair of jaws 175, 176, is mounted upon one side of the head, the pivot-pins 177 and 178 of said jaws being seated in the openings in the arm 173 and the openings 170 and 171. The inner end of each pin is formed with a lip or projection, which pass into recesses formed in the adjacent ends of pivot-pins 179, 180 of a second pair of jaws or jaw-carriers hereinafter referred to. The jaws 175, 176 are provided with intermeshing teeth 181, concentrically disposed with reference to their pivots or fulcrums, so that any motion imparted to one jaw will necessarily be transmitted to the other. Each jaw is provided with a roughened, substantially semicircular seat or recess 182, Fig. 25, in which one arm of the half-link is grasped when the elevator is lowered in line therewith and the slide moved forward into operative relation with such part and the half-links carried thereby. The jaws are kept normally closed by springs 183, 184, secured to a stud 185 extending outwardly from the slide 144. The lower jaw 176 is provided with a rearward extension or tail-piece 186 which coacts with fingers 187 and 188, Figs. 13 and 15 carried at the opposite ends of a rock-shaft 189, said shaft being mounted in a bearing formed in the post or column 136, best shown in Fig. 31. Said shaft has also secured to it a sector-gear 190 which meshes with a similar gear 191 formed upon the upper end of a lever 192. A roller 193 carried by the lower end of said lever coacts with a cam 194 mounted upon shaft 5. This mechanism serves to open both pairs of pincers preparatory to their grasping the two half-links, and again opens them after the link has been positioned and clamped in the clamping and welding jaws 56, 57 and 60, 61.

The inner end of shaft 155 is provided with a miter-gear 195, which meshes with teeth 196 formed upon one end of a plate 197. Said plate is secured to the upper reduced end of a shaft or rod 198, Fig. 26, which, when the parts are assembled, is passed upwardly through the opening 169 formed in the head 168. The lower end of said shaft has secured to it a sector-gear 199, provided with relatively long teeth. The plate 197 is provided at its outer end with a series of long teeth 200, said teeth meshing with similar teeth formed upon a plate 201, secured to the upper face of the upper jaw 202. Said jaw is provided with a rearwardly extending T-shaped projection 203, which works in a correspondingly-shaped curved way formed in the pincer body 204. A plate 205 is secured to the upper portion of said body 204 and the downwardly-projecting forward end thereof overlies the upper portion of the T-shaped projection and holds the movable jaw 202 in place. The T-shaped projection 203 and the way formed in the pincer-body 204 in which said projection is seated are formed upon the same curve, so that each jaw may be moved in said body 204 when the plate 197 is rotated through the action of the gear 195.

The pincer-body is carried by the pivot-pin 179 hereinbefore referred to and a short pin or stud axle 206, the latter being seated in the downwardly-projecting arm 174. Said pincer body is provided with a series of teeth 207 which mesh with corresponding teeth formed upon the lower pincer body 208, as shown in detail in Fig. 24. Said body is carried by the pivot-pin 180 and a pin or stud axle 206ª, as best shown in Fig. 20. The lower pincer body is similar in construction to the upper pincer body, and carries at its outer end a movable jaw 209, shown in detail in Fig. 27. Said jaw is provided with a T-shaped rearwardly-extending rib or projection 210 and with a series of teeth 211 formed upon a plate 212 secured to the jaw, said teeth 211 meshing with the teeth formed upon the sector-gear 199. A plate 213, similar in construction to the plate 205 is secured to the lower pincer body 208, and serves to hold the movable jaw in position. Springs 214 secured to a stud 215 extending outwardly from the slide 144 serve to rock the pincer bodies 204 and 208 upon their pivots and to throw the jaws carried thereby toward each other.

The rocking motion imparted to the pincer jaws 175, 176 by the fingers 187, 188 will, of course, through the connection between the pivot-pins 177, 179 and 178, 180, be imparted to the jaws 202 and 209. This opening and closing of said jaws will throw the teeth formed upon the plates 201 and 212 rearwardly into the elongated spaces between the teeth on the sector-gear 199. It is on account of this rocking or tilting motion that the teeth are formed in the manner shown, they always being in mesh but not binding, so as to prevent movement or rotation of the jaws in the pincer bodies.

The operation of this mechanism is as follows: Assuming that the parts are in the positions shown in Fig. 13, and that the elevator or carrier has been lowered with two half-links in the receptacles or carriers 115, the slide 144 will be advanced or brought into the position shown in Fig. 16, the finger 187 at such time acting upon the tail-piece 186 of the lower pincer body, thereby compressing the springs 183, 184, and also the springs 214, and in so doing rocking the pincers about their pivots, and opening the jaws thereof. The cam 194 then rocks the shaft 189 and thereby lowers the finger 187, permitting the jaws to close upon the blanks in the receptacle. Should there be any slight difference in the diameter of the stock of the half-links, the pincer jaws will accommodate themselves by the slight play allowed between the pivot-pins 177, 179 and 178, 180. The receptacle is then lowered to the position shown in dotted lines in Fig. 14, and simultaneously therewith the cam 153, acting through the connection before described, advances the slide 144 and the attached parts inwardly to a position where the jaws 56, 57 and 60, 61 may close down upon the free ends of the two half-links carried by the pincers. As before noted, when said jaws have closed down upon the blanks, the finger 188 is brought up against the tail-piece 186 and opens the pincers and holds them open until they are moved away from the blanks, which are held by the jaws, as just noted. Where short links are being made, it is necessary that the half-link which is to be passed through the previously-formed link should be threaded through such link, for the reason that the half-link cannot be readily passed through the space left between the end of the link and the previously-formed link; see Fig. 21. The adjustment of the cams is such that after the pincers have grasped the half-links and removed them from the elevator or receptacles 115 the shaft 155 is given a partial revolution and the jaws 202 and 209 are rotated in unison to the position shown in Fig. 21. This position is maintained until the half-link carried by said jaws is passed into the previously-formed link, when a rotation in the opposite direction is imparted to the shaft 155 and consequently the half-link is turned to its proper position with reference to the clamping jaws 60 and 61. In other words, it is rotated so as to bring the ends of the half-link into parallelism with the ends of the corresponding half-link carried by the other pincers and placed between the jaws 56 and 57. This partial rotation of the half-link which is threaded through the previously-formed link is a matter of importance and enables me to automatically interlock the blank with the previously-formed link where very short links are being made. In case long links are being formed, the construction shown in Figs. 28 to 30 inclusive may be employed. As will be seen upon reference to said figures, the oscillating or swinging movement of one pair of pincer jaws is done away with, and instead a slide 216 carries two pairs of pincers formed by the jaws 217, 218 and 219, 220. The upper and lower jaws of each pair intermesh and the pivot-pins 221 and 222 are common to the upper and lower jaws, respectively. As in the other construction, the jaws are designed to be held closed by springs and to be opened at the proper moment through the action of the fingers 187 and 188, carried by the rock-shaft 189. The long links afford sufficient room for the passage of the half-link therethrough, so that threading or turning of the blank in order to pass it through the previously-formed link is rendered unnecessary.

*Bur-preventing mechanism.*—In order to prevent the formation of burs or undue enlargements of the body of the link at the points of welding I employ the mechanism shown in Figs. 2 and 33 to 37 inclusive.

Secured to the bed of the machine, to one side of the welding jaws, are two posts or columns 223 and 224 (Fig. 35). Pivotally mounted between said posts or columns are an upper and a lower jaw-carrier 225 and 226. The hubs of said carriers are provided with intermeshing teeth 227, which cause said parts to open and close in unison. Secured to the upper carrier is a jaw 228 of the form best shown in Fig. 37, while the lower carrier is provided with a similar jaw 229. The jaws are provided with complemental swaging and cutting teeth 230, which, when the jaws come together, as shown in Fig. 33, form substantially circular openings of a diameter approximating the cross-section of the link-body.

Secured to the lower jaw-carrier 226 is an arm 231, the outer end of which carries a roller 232 which coacts with a cam 234 mounted upon and carried by the shaft 3. Said cam alternately opens and closes the jaws, the latter being closed down just previous to the completion of the weld. After the weld is finished the cam opens the jaws and holds them in such position until new blanks have been introduced and a further weld is to be effected.

The lower carrier 226 is provided with a downwardly-projecting arm or member 235 (Fig. 33) secured to which is an adjustable wedge-block 236, said block overlying the cam surface 237, formed upon the upper end of a lever 238. Said lever is fulcrumed at 239 in the outer end of arms 240 secured to a plate 241 which is pivotally connected at 242 to the upper jaw-carrier 225. Said plate, as will be best seen upon reference to Fig. 36, passes down between the companion plates of the jaw-carriers 225 and 226, all of these parts being made of relatively thin steel so that they may freely pass in between the welding jaws and yet not come in contact therewith as the jaws are brought together in the act of making the final weld.

Inasmuch as the arms 240 and lever 238 extend inwardly beneath the wedge-block 236, it is necessary to swing the plate 241 about its pivot 242 so that the jaws may be separated. To effect this swinging movement to properly position and withdraw the parts from beneath the wedge-block 236, a rod 243 (Fig. 34) is secured to the lower end of the plate 241, a link 244 being connected at one end to the opposite end of said rod. The other end of the link 244 is pivotally connected to an arm or lever 245 fulcrumed upon a shaft 246. Arm or lever 245 carries a roll 247, which coacts with a cam 248. This cam is so timed as to withdraw the arms and the cam-lever 238 from beneath the wedge-block prior to the cam 234 coming into action.

To force the jaws 228 and 229 together upon the hot metal and thereby swage the same and remove the excess material, power is applied to the cam-lever 238 to rock it when the jaws are closed upon the link being welded. An adjustable link 249 is pivotally connected to the lower end of the lever 238, the opposite end of the link being connected to the lower end of a pendulous frame 250, fulcrumed upon the shaft 246. Said frame carries a roller 251, which coacts with a cam 252 mounted upon the shaft 3. The frame also carries a roller 253 which coacts with a cam 254.

The operation of the cams may be briefly stated as follows: Cam 248, acting through the link 244 and rod 243, swings the locking plate into and out of operative position with reference to the jaws. Cam 234, acting through the arm 231, serves to open and close the jaws. Cam 252, acting through the pendulous frame and the roller 251 carried thereby, applies pressure to the jaws by swinging the cam-lever 238. Cam 254, acting upon the roller 253, swings the lever 238 outwardly and keeps the roller 251 in contact with its cam. By adjusting the wedge-block 236, greater or less pressure may be applied to the jaws and by reason of the construction shown the pressure may be made quite heavy.

*Mechanism for holding and positioning the completed links.*—Inasmuch as the half-links are held in a horizontal position while they are being welded to form a complete link, it is necessary to turn such completed link to a vertical position and maintain it in such plane while the next half-link, which is fed in horizontally, is being interlocked therewith. The mechanism by which this is accomplished and the completed links (the chain) are fed rearwardly or withdrawn from the welding jaws will now be described, reference being had to Figs. 2, 3, 4, 38 to 43 inclusive, and 51 and 52.

Secured to the bed 1, see Fig. 38, is a barrel 255, said barrel being open at both ends and provided with a shouldered enlargement 256 at what may be termed the discharge end of the barrel. A foot-piece 257 extends downwardly from the shouldered portion 256 and is securely fastened to the bed. Mounted upon the forward end of the barrel is a sleeve 258, the forward end being provided with an inwardly-projecting collar 259 in the rear of which is formed the beveled face 260 which forms the forward wall of an enlarged internal annular recess 261. The sleeve is likewise provided upon its outer face with an annular groove 262, Figs. 39 and 42, in which work rollers 263 and 264, the former being carried upon the free end of an arm 265, and the latter upon a lever 266, the arm and lever being made fast to a shaft 267 journaled in a vertically-disposed bearing formed in a lateral extension 268 of a bracket 269 secured to the bed. The short end of lever 266 carries a roll 270 which works in the groove of a cam 271 carried by shaft 5. Said cam, by swinging the lever and arm, imparts to the sleeve an endwise reciprocating movement, and causes the collar 259 and its inclined face 260 to open and close the link-holding and turning jaws in a manner hereinafter set forth.

Secured to the bed, see Figs. 2, 4 and 43, is a bracket 272, said bracket and bracket 269 supporting a shaft 273 upon which is mounted a cam 274 and a connected gear 275, the latter being driven by a pinion 276 secured upon shaft 5. A lever 277, fulcrumed upon a pin extending horizontally from bracket 272 toward cam 274, carries a roller which coacts with the cam, the inner end of the lever being provided with a sector-gear or rack 278 which meshes with a gear 279 formed upon a quill 280. Said quill is considerably larger than the barrel 255, projecting beyond each end thereof, as is clearly seen upon reference to Figs. 38 and 39. Slidably mounted upon the rear end of the quill 280 is a collar 281, provided with a peripheral groove in which are mounted rollers 282 and 283, said rollers being carried at the outer ends of a yoke-shaped lever 284 (Fig. 43) fulcrumed upon a vertically-disposed shaft mounted in an extension 285 formed upon the bracket 272. The outer end of the lever 284 carries a roller 286 which works in the groove of a cam 287 mounted upon the shaft 5. Extending forwardly from said collar 281 are two rods 288, 289, which pass through openings in the gear 279 formed upon the quill 280 and occupying a position directly in rear of the shouldered enlargement 256. The forward ends of said rods 288, 289 are threaded and pass into the rear end of a tubular carrier 290 mounted upon the forward end of the quill. While said carrier may have a longitudinal movement with reference to the quill, it nevertheless oscillates therewith by reason of the interposition of the feathers 291 between these parts, see Fig. 40.

The tubular carrier is provided with oppositely-disposed bearings 292, 293, which form the support for the pivot-pins or rods 294, 295, of the jaw-frames mounted upon said carrier. The frames and jaws carried thereby are of the form best shown in Fig. 41.

Extending forwardly of the pivot-pins are parallel side bars 296, 297, carrying at their outer ends a cross-bar 298, to which the jaw proper 299 is secured. The outwardly-projecting central portion of the jaw is provided with a recess or seat 300, Fig. 40, of such form and size as to properly receive that portion of the link which stands in line therewith. A corresponding opening in the companion jaw forms a continuous curved socket or recess, designed to bear against the rear face of one of the links, as best shown in Fig. 39.

Each frame is provided with a rearward extension 301 on which is mounted a roller 302, designed to coact with the inwardly-projecting collar 259 and the beveled face 260 thereof, which serves to close the jaws against the action of springs 303 which are attached to the jaw-carrying frames forward of their pivotal points, the springs acting to open the jaws.

Secured to the forward end of the barrel 255 is a ring 304, said ring bearing against the rods 288 and 289 and forming a proper support therefor.

The operation of these parts is as follows: When the weld is taking place, the parts are in the positions shown in Fig. 3, the sleeve and jaw-carrier being fully forward with the jaws 299 closed and bearing against the outer end or curved portion of the half-link which has just been inserted in the last-formed link, dotted line position Figs. 38 and 39. The cams are so timed that when the jaws 60, 61 and 62, 63 are rocked, and thus release the now completed link, a partial rotation is imparted to the quill 280 and the jaws 299, thereby transferring the newly welded link from a horizontal to a vertical position. The sleeve 258 and jaw-carrier 290 are then moved out in unison a short distance, at which point they dwell for a short period of time to permit a new half-link to be threaded in, as before described. The jaws 299 are then moved rearward to the full extent, bringing the faces of the last completed link and the threaded-in blank into contact, see Fig. 39. The blank is then clamped by the welding jaws and the link-holding jaws 299 are opened fully, as shown in Fig. 38. At the same time a pocket-wheel, hereinafter referred to in detail, pulls the chain one step from the machine. A reverse movement of the parts will advance the jaws 299 to a position where they will close and engage the outer or rounded face of the horizontally-disposed half-link or blank which has just been threaded into the last formed link, this position of the parts being shown in dotted lines in Figs. 38 and 39. In its outward movement the quill has imparted to it a quarter revolution,—the first movement,—and a second quarter revolution during the second stage of the outward movement. In other words, the quill and the jaw-carrier revolve a quarter of a revolution in one direction, say to the right, and then, after a dwell, a further quarter revolution in the same direction. During the reverse movement they have imparted to them a quarter revolution to the left, and again a second quarter revolution in the same direction. When the jaws 299 are carried forward toward the welding jaws, the outer locking sleeve 258 is given a slight rearward movement to fully close the jaws 299 against the rear face of the link through which the new blank has been threaded. The forward movement of the jaws 299 takes place simultaneously with the last quarter revolution of the quill and jaw-carrier. The completed chain is passed through the quill 280 to a pocket-wheel 305, best shown in Figs. 51, and 52. A shaft 306, upon which said pocket-wheel is mounted, is carried in bearings 307, formed on the extensions or brackets 88 and 89. Arms 308 and 309 extend outwardly from the upper portion of such bearings, and a wheel 310 (Figs. 2, 4 and 52) is mounted upon a shaft carried by said bearings, the wheel standing in line with the periphery of the pocket-wheel and serving to maintain the chain therein. A pawl-carrier 311, pivotally mounted upon the shaft 306, and a pawl 312 mounted upon said carrier, coact with a ratchet-wheel 313, mounted upon the hub of the pocket-wheel 305. A link 314 is pivotally connected to the pawl-carrier at one end and likewise connected at the opposite end to a lever 315, fulcrumed upon a shaft 316 secured in the lower end of the brackets 88 and 89. A roller 317 mounted upon the lever coacts with cam 318, carried by the shaft 4. As will be readily seen this mechanism imparts a step-by-step movement to the pocket-wheel, and consequently draws the chain through the quill step by step. The cam 318 is so timed in its action with reference to the cams which operate the link-turning mechanism just described that all of such parts work in unison. It will, of course, be understood that when the machine is started a section of chain will be placed in position and threaded through the various parts, just described, in order that the blanks may be properly positioned and the completed links withdrawn in the form of a chain.

*Swell and bur removing devices.*—In order to absolutely finish the links and make them of uniform size and diameter throughout, it may be found desirable to employ mechanism for removing the surplus stock from the links, in addition to the swaging and cutting jaws. This is particularly desirable where heavy links are being welded.

Inasmuch as every alternate link of the completed chain occupies a horizontal position, while the intermediate links stand at right angles thereto or in a horizontal plane, it is necessary to employ two sets of cutters, a horizontally-disposed set and a vertically-arranged set. Each set comprises two pairs of cutters, one pair arranged to act upon one half of the straight portion of the link body, while the second pair acts upon the opposite face. Means are employed in conjunction with the cutters to properly position and hold the link which is being acted upon. This portion of the machine is best illustrated in Figs. 1, 2, 3, 4, 6, 44 to 51 inclusive, and 53 and 54.

Referring first to the horizontally-disposed cutters: Secured to the bed 1 is a bracket or supporting casting 319, Figs. 2, 3, 44, 49 and 50, provided with bearing sleeves 320 and 321, the latter having a shaft 322 mounted therein. Said shaft at its outer end carries a bevel-gear 323 which meshes with a similar gear 324, secured to the outer end of a shaft mounted in a bearing 325 secured to the bed. A lever 326 is also secured upon the shaft with gear 324, the outer end of the lever carrying a roller which coacts with a cam 327. By the action of the cam an oscillating movement is imparted to the gear 324, which in turn transmits it to shaft 322. A sleeve 328, provided with an outwardly-extending arm 329 and with a sector-gear 330, is splined upon shaft 322. The outer end of arm 329 carries a head or bearing-block 331, in which is mounted a bushing or bearing-sleeve 332 for a shaft 333 which extends therethrough. The outer end of the shaft is reduced and carries a pair of cutters 334 and 335 of the form best illustrated in Fig. 45, the cutters being spaced apart the requisite distance by an interposed washer 336. The opposite end of the shaft is secured to a block 337, which in turn is connected to a second block 338 by an interposed universal coupling 339.
Block 338 is secured upon one end of a shaft 340 which is mounted in a bearing 341 extending upwardly from a bracket 342 secured to the bed. A gear 343 carried by the opposite end of the shaft 340 meshes with a similar gear 344 secured to a shaft mounted in a bearing 345. Said latter shaft, through a universal coupling 346, imparts rotary movement to a second pair of cutters 347 and 348, the shaft upon which said cutters are mounted being carried by a head or bearing-block 349, upon an arm 350 extending outwardly from a sleeve 351. A sector-gear 352 is also carried by the sleeve 351 and meshes with the companion gear 330, said sector-gears causing the sleeves 328 and 351 and their attendant parts to rock as the shaft 322 is oscillated, thereby carrying the cutters into and out of contact with the horizontally-disposed links, the cutters being raised and lowered sufficiently to permit the chain to pass freely when it is advanced by the pocket-wheel 305.

Rotary motion is imparted to the cutter shafts through a bevel-gear 353 which meshes with a similar gear 354, see Figs. 1, 4 and 6, the latter being carried upon the lower end of a shaft 355 mounted in suitable bearings secured upon a frame 356 which surmounts the bed 1 near the discharge end of the machine. The frame also supports a shaft 357, to which motion is imparted by a belt 358.

To properly support and hold the horizontally-disposed links while the cutters are acting thereon, the machine is provided with an underlying U-shaped anvil or support 359 carried by an arm 360 extending upwardly from a foot-piece 361 secured to the bed, and with an overlying U-shaped anvil or support 362, which is carried by a bracket 363 secured to bracket 319. Each of the anvils is provided in its opposite edges with a pair of oppositely-disposed notches 364, said notches permitting the entrance of clamping fingers 365, carried by arms 366 and 367 which are fulcrumed on the foot-piece 361 and provided with intermeshing teeth 368. A lever 369, secured to arm 367, coacts with a cam 370 to close the arms and cause the notched or recessed fingers to firmly grasp the rounded or end portions of the links, and thus, acting in conjunction with the anvils or supports, to hold the links against all movement when the cutters are in operation. As will be noted upon reference to Fig. 50, the upper and lower anvils stand out of line with each other, but the arms 366 and 367 are coextensive of both.

The cutters and attendant parts for operating upon the upper and lower members of the vertically-disposed links are the same in general form as those just described.

Oppositely-disposed U-shaped anvils or supports 371 and 372, having notched edges for the reception of the recessed fingers 373 of the arms 374 and 375, are arranged upon opposite sides of the chain, the anvils being carried at the upper ends of brackets 376 and 377 secured to the bed. Arms 374 and 375 are carried by intermeshing sleeves 378 and 379, secured to shafts 380 and 381 mounted in a post or column 382, see Fig. 55. An arm 383, secured to shaft 381, is pivotally connected with a link 384, the link in turn being connected to a lever 385 fulcrumed at 386, Fig. 54, and coacting at its lower end with a cam 387 mounted on shaft 3.

Swiveled upon the two vertically-disposed shafts or posts 388 and 389, extending upwardly from casting or block 390, are sleeves 391 and 392, the sleeves being provided with intermeshing sector-gears 393 and 394 and laterally-projecting arms 395 and 396. Each of said arms carries a vertically-disposed bearing member 397 and 398, in which are mounted the shafts carrying the cutters 399, 400, and 401, 402, the cutters being the same in all respects as those heretofore described.

Bearing 398 is provided with a boss or lug 403 to which is connected a link 404, the link in turn being connected to the upper end of a lever 405, fulcrumed at 406 and coöperating at its lower end with a cam 407.

The cutter shafts are, through universal connections 408 and 409, connected to the shafts carrying the intermeshing gears 410 and 411, the shaft upon which the latter is secured likewise carrying a bevel-gear 412, which meshes with a bevel-gear 413 keyed to the constantly-running shaft 357.

From the foregoing description it will be seen that when the chain is periodically grasped and released by the recessed fingers 373, said fingers are brought into operative relation with the links immediately the pocket-wheel comes to rest. The cutters are also thrown into contact with the links as soon as they are clamped and continue to act so long as the chain remains at rest. By having the cutters operate upon opposite faces of the links it is possible to properly support the links and hold them up to the cutters, so that when the links have passed both sets of cutters the diameter of the body thereof will be the same, or substantially the same, size throughout.

It is to be noted that the cutters may be dispensed with under certain conditions, and particularly is this true when links the bodies of which are of small diameter are being welded, the swaging and cutting jaws then preventing the formation of burs, swells or enlargements upon the links.

It is manifest that when stock of different diameters is employed, it will be necessary to change the jaws or the removable plates mounted thereon in order to accommodate the stock and securely hold it when the clamping and welding jaws are closed.

So far as the generic features of the invention are concerned, the claims are to be broadly construed, as it is evident that the many details of construction may be changed without departing from the spirit of the invention.

Having thus described my invention, what I claim is:

1. In a chain-welding machine, the combination of a plurality of clamping and welding jaws, said jaws being arranged in two oppositely-disposed series; means for bringing the jaws of each series into clamping relation with a blank to be welded; and means for securing a relative movement of the two series of jaws toward each other.

2. In a chain-welding machine, the combination of a plurality of clamping and welding jaws, said jaws being arranged in two oppositely-disposed series; means for rocking the jaws of each series toward and from each other to clamp the blanks to be welded; and means for securing a relative movement of the two series of jaws toward each other.

3. In a chain-welding machine, the combination of two series of oppositely-disposed jaws, each series comprising two pairs of jaws; means for opening and closing the jaws of each pair; and means for securing a relative movement of the two series of jaws toward each other.

4. In a chain-welding machine, the combination of two series of oppositely-disposed jaws, each series comprising two pairs of rocking jaws; means for rocking the jaws of each pair to open and close the same; and means for moving the jaws of the two series toward each other after the jaws are closed.

5. In a chain-welding machine, the combination of two series of oppositely-disposed jaws, each series comprising two pairs of rocking jaws; means for rocking the jaws of each pair to open and close the same; and means to secure a relative movement of the two series toward each other with the jaws of each series slightly separated, whereby the blanks may, when brought into contact, shift slightly and thereby insure even contact between their ends.

6. In a chain-welding machine, the combination of a set of jaws arranged to clamp a blank; a second set of jaws adapted to clamp a blank; means for securing a relative movement of the sets of jaws toward each other to bring the blanks into welding contact; and means for momentarily releasing both of the blanks previous to the passage of the welding current.

7. In a welding machine, the combination of two series of oppositely-disposed jaws, each series comprising two pairs of jaws, said pairs being arranged to grasp the rounded end of a half-link; means for closing the jaws of each series upon such blanks; means for securing a relative movement of the jaws of the two series toward each other and thereby bringing the ends of oppositely-disposed blanks into contact; and means for partially releasing the blanks as the ends are brought into contact, whereby one half-link will have an even and fair bearing with the other.

8. In a welding machine, the combination of two series of oppositely disposed jaws, each series comprising two pairs of jaws; fixed supports for the jaws of one series; means for opening and closing the jaws of such series; movable supports for the second series of jaws; means for opening and closing the jaws of the second series; and means for advancing the movable supports and the jaws carried thereby toward the first set of jaws.

9. In a welding machine, the combination of two series of oppositely-disposed jaws, each series comprising two pairs of jaws; means for closing the jaws of two oppositely-disposed pairs; and means for subsequently closing the remaining jaws, whereby two half-links may be grasped by the first closed jaws and subsequently grasped by the remaining jaws.

10. In a welding machine, the combination of fixed clamping jaws; movable clamping jaws; means for positively advancing said jaws toward the fixed jaws; and a yielding device interposed between said means and the movable jaws.

11. In a welding machine, the combination of two series of oppositely-disposed jaws, each series comprising two pairs of jaws; fixed supports for the jaws of one series; means for opening and closing the jaws of said series; movable supports for the second series of jaws; means for opening and closing the jaws of the second series; and means, including a yielding device, for advancing the movable supports toward the first set of jaws.

12. In a welding machine, the combination of two series of oppositely-disposed jaws, each series comprising two pairs of jaws; fixed supports for the jaws of one series in which said jaws are pivotally mounted; means for rocking said jaws upon their pivots to open and close the same; movable supports for the second series of jaws upon which said second series of jaws are pivotally mounted; means for rocking said jaws to open and close the same; and means for advancing the movable supports toward the first set of jaws.

13. In a welding machine, the combination of two series of oppositely-disposed jaws, each series comprising two pairs of jaws; fixed supports for the jaws of one series in which the jaws are pivotally mounted; intermeshing connections between said jaws; means, including a yielding device, for rocking said jaws; movable supports for the second series of jaws, in which said second series of jaws are pivotally mounted; intermeshing connections between each pair of said second series of jaws; means, including a yielding connection, for rocking said jaws; and means, including a yielding connection, for advancing the movable supports toward the opposite series of jaws.

14. In a chain-welding machine, the combination of a plurality of clamping and welding jaws, said jaws being arranged in two oppositely-disposed series; means for bringing the jaws of each series into clamping relation with a blank to be welded; means for securing a relative movement of the two series of jaws toward each other; and means for properly positioning the welded link and maintaining it in such position for the reception or interlocking of one of the next half-links to be welded.

15. In a chain-welding machine, the combination of a plurality of clamping and welding jaws, said jaws being arranged in two oppositely-disposed series; means for bringing the jaws of each series into clamping relation with a blank to be welded; means for securing a relative movement of the two series of jaws toward each other; means for feeding blanks to said jaws; and means for turning the completed link to a position where it may receive one of the half-links which is fed inwardly to the jaws by said feeding means.

16. In a welding machine, the combination of two series of oppositely-disposed jaws, each series comprising two pairs of jaws; means for presenting a half-link to each of said series of jaws; means for closing the jaws of the two oppositely-disposed pairs; and means for subsequently closing the remaining jaws, whereby two half-links may be first grasped by the closed jaws and then grasped by the remaining jaws.

17. In a welding machine, the combination of two series of oppositely-disposed jaws, each series comprising two pairs of jaws; means for feeding a half-link to each series of jaws; means for closing the jaws of two oppositely-disposed pairs; means for retracting the half-link feeding means after said pair of jaws has been closed; means for subsequently closing the remaining jaws, whereby the two half-links will be clamped by said remaining jaws; and means for securing a relative movement of the jaws of the two series toward each other.

18. In a welding machine, the combination of two series of oppositely-disposed jaws, each series comprising two pairs of jaws; means for presenting a half-link to each series of jaws; means for closing the jaws of two oppositely-disposed pairs; means for withdrawing the blank-presenting means; means for closing the remaining jaws; means for securing a relative movement of the jaws of the two series toward each other; and means acting between the two series of jaws to prevent the formation of burs or undue enlargements upon the welded portions of the links.

19. In a chain-welding machine, the combination of clamping and welding jaws; means for presenting two U-shaped blanks thereto; means for bringing the ends of the blanks into welding contact; and means for preventing the formation of burs or undue enlargements upon the welded portions of the links.

20. In a chain-welding machine, the combination of a series of jaws adapted and arranged to hold two oppositely-disposed U-shaped blanks in welding position; a pair of cutting and swaging jaws arranged intermediate the welding jaws; and means for applying heavy pressure to said cutting and swaging jaws at or about the time of making the weld between the two blanks.

21. In a chain-welding machine, the combination of a plurality of clamping and welding jaws adapted to hold two U-shaped blanks in welding contact; a pair of cutting and swaging jaws arranged between the welding jaws; means for opening and closing said cutting and swaging jaws; and means for applying heavy pressure to said cutting and swaging jaws, whereby the formation of burs or undue enlargements upon the welded portions of the links is prevented.

22. In a chain-welding machine, the combination of a plurality of clamping and welding jaws adapted and arranged to hold two oppositely-disposed U-shaped blanks in welding contact; a pair of swaging and cutting jaws arranged intermediate said welding jaws in line with the ends of the blanks to be welded; means for simultaneously rocking said welding and cutting jaws; and means for applying heavy pressure to said jaws, whereby the formation of burs or undue enlargements upon the welded portions of the links is prevented.

23. In a chain-welding machine, the combination of a plurality of clamping and welding jaws; a pair of swaging and cutting jaws arranged to act upon the link at the points of welding; pivoted jaw-carriers for said jaws; means for rocking said carriers about their pivots and opening and closing the jaws; a locking plate pivotally secured to one of said carriers and extending beneath the other carrier; means for rocking said plate about its pivot; and means carried by said plate for applying heavy pressure to the jaw-carrier immediately adjacent thereto, whereby the formation of burs or undue enlargements upon the welded portions of the links is prevented.

24. In a chain-welding machine, the combination of a plurality of clamping and welding jaws adapted and arranged to hold a pair of U-shaped blanks in welding position; a pair of swaging and cutting jaws; a pair of jaw-carriers pivotally mounted to one side of the swaging and cutting jaws; intermeshing connections between said jaw-carriers; means for rocking one of said carriers and thereby rocking the other; a locking plate pivotally connected to the upper carrier and provided with arms at its lower end, which extend beneath the lower jaw-carrier; means for rocking said plate about its pivot; a cam lever pivotally connected to the locking plate at a point below the lower jaw-carrier; and means for swinging said lever about its pivot, whereby heavy pressure may be applied to the jaws, substantially as and for the purpose described.

25. In a chain-welding machine, the combination of a plurality of clamping and welding jaws adapted and arranged to hold a pair of U-shaped blanks in welding position; a pair of swaging and cutting jaws; a pair of jaw-carriers pivotally mounted to one side of the swaging and cutting jaws; intermeshing connections between said jaw-carriers; means for rocking one of said carriers and thereby rocking the other; a locking plate pivotally connected to the upper carrier and provided with arms at its lower end, which extend beneath the lower jaw-carriers; means for rocking said plate about its pivot; a cam lever pivotally connected to the locking-plate at a point below the lower jaw-carrier; means for swinging said lever about its pivot, whereby heavy pressure may be applied to the jaws; and an adjustable wedge-block interposed between said cam-shaped lever and the lower end of the lower jaw-carrier.

26. In a chain-welding machine, the combination of a plurality of clamping and welding jaws adapted to hold two U-shaped blanks in welding position; means acting in conjunction therewith to properly position the previously-formed link; a feeding mechanism arranged to present the blanks to the clamping and welding jaws; and means for threading one of said half-links through the previously formed link.

27. In a chain-welding machine, the combination of a plurality of clamping and welding jaws adapted and arranged to hold two U-shaped blanks; means acting in conjunction therewith to properly position the previously-formed link; blank-presenting mechanism for carrying U-shaped blanks to said jaws; and means for turning one of said blanks endwise and rotating the same to its normal position, after it has been passed through the previously-formed link.

28. In a chain-welding machine, the combination of two series of oppositely-disposed jaws adapted and arranged to hold two U-shaped blanks; means for securing a relative movement of the series toward each other; means acting in conjunction with said jaws to properly position the previously-formed link; blank-presenting mechanism for carrying the U-shaped blanks to said jaws; and means for turning one of said blanks endwise and rotating the same to its normal position after it has been passed through the previously-formed link.

29. In a chain-welding machine, the combination of a plurality of oppositely-disposed clamping and welding jaws; means acting in conjunction therewith to turn and hold the previously-formed link at substantially right angles to the position which its component blanks previously occupied; means for presenting two half-links to said jaws; means for threading one of said half-links through the previously-formed and positioned link; means for withdrawing said blank-presenting means; and means for advancing the jaws toward each other and bringing the ends of the blanks into welding contact.

30. In a chain-welding machine, the combination of a plurality of clamping and welding jaws arranged in oppositely-disposed series, each series being adapted and arranged to clamp a U-shaped blank; means acting in conjunction with one of said series to turn the previously-formed link and hold it in a substantially vertical position; a blank-presenting mechanism comprising two pairs of pincers; means for advancing said pincers in between the clamping and welding jaws; and means for rotating the jaws of one pair of pincers, whereby the blank carried thereby will be threaded through the previously-formed and positioned link.

31. In a chain-welding machine, the combination of a plurality of clamping and welding jaws arranged in two oppositely-disposed series, each series being arranged to hold a U-shaped blank; means for presenting a U-shaped blank to each series of jaws, said means comprising two pairs of pincers, each adapted to hold a blank; means for rotating the jaws of one pair of pincers, whereby the blank carried by said jaws may be threaded through the previously-formed link; means for holding said previously-formed link in proper position; and means for releasing the pincers when the blanks have been clamped by the clamping and welding jaws.

32. In a chain-welding machine, the combination of two series of oppositely-disposed clamping and welding jaws, each series comprising two pairs of jaws; a blank-presenting mechanism movable inwardly from one side of the machine between said clamping and welding jaws; a pair of pincers carried by said blank-presenting mechanism; means for closing a pair of jaws of each series upon the blanks carried by the pincers; means for releasing the pincers and withdrawing the same; means for closing the remaining clamping and welding jaws upon the blanks; and means for advancing said jaws to bring the oppositely-disposed ends of the blanks into welding position.

33. In a chain-welding machine, the combination of a plurality of clamping and welding jaws; a magazine located to one side thereof adapted and arranged to hold a series of U-shaped blanks; an elevator movable toward and from the lower end of said magazine; means for discharging a pair of blanks onto said elevator; a blank-presenting device carrying two pairs of pincers; means for closing said pincers upon the blanks deposited upon the elevator; means for advancing said device inwardly between the jaws; means for bringing one pair of jaws in each series into clamping position with relation to the blanks; means for releasing the pincers and withdrawing the same from between the jaws; and means for closing the remaining clamping and welding jaws upon the blanks.

34. In a chain-welding machine, the combination of a plurality of clamping and welding jaws arranged in oppositely-disposed series; a magazine located to one side of the jaws; an elevator movable toward and from said magazine; means for depositing a pair of blanks upon said elevator; a slide carrying a pair of pincers, said pincers being normally closed; means for opening said pincers, and moving them into grasping position with reference to the blanks upon the elevator; means for lowering the elevator out of line with the slide; means for advancing the slide inwardly between the clamping and welding jaws; means for causing a pair of jaws in each of the oppositely-disposed series to clamp the blanks; means for opening the pincer jaws when the blanks are so clamped; means for retracting the slide; and means for closing the remaining clamping and welding jaws upon the blanks.

35. In a welding machine, the combination of a plurality of clamping and welding jaws; means working in conjunction therewith for properly positioning and holding the previously-formed link; a slide movable inwardly between said jaws; a pair of pincers carried by said slide arranged to grasp the blanks and to carry them inwardly into clamping position with relation to the clamping and welding jaws, one of said pincers being provided with laterally-movable jaws; and means for moving said jaws, whereby the blank carried thereby may be threaded through the previously-formed link.

36. In a welding machine, the combination of a plurality of clamping and welding jaws; a slide movable inwardly between said jaws; a pair of pincers mounted upon one side of said slide, said pincers being normally closed; means to open said pincers to permit the same to grasp a blank and to again open the same when it has been moved inwardly in line with the clamping and welding jaws; a second pair of pincers mounted upon the opposite side of said slide and operatively connected with the first pair of pincers; a pair of swinging jaws carried at the outer ends of said second pair of pincers; and means for swinging said jaws, whereby the blank carried by said jaws will be threaded through the previously-formed link and properly positioned with relation to the clamping and welding jaws, substantially as described.

37. In a welding machine, the combination of a plurality of clamping and welding jaws; a magazine located to one side thereof; an elevator movable up and down toward said magazine; means for depositing a pair of blanks upon said elevator when the same is in its elevated position; a shoe arranged in line with the elevator and the space between the oppositely-disposed clamping and welding jaws; a pair of pincers carried by said slide; means for opening the jaws of the pincers and advancing them into clamping position with reference to the blanks carried by the elevator; means for lowering the elevator; means for advancing the slide with the pincers and the blanks carried thereby inwardly between the clamping and welding jaws; means for rotating the jaws of one pair of pincers to thread the blank carried thereby through the previously-formed link; means for closing a pair of jaws in each of the oppositely-disposed series, whereby the blanks will be partially clamped; means for opening the pincer jaws and retracting the same from between the clamping and welding jaws; and means for closing the remaining clamping and welding jaws upon the blanks.

38. In a welding machine, a blank-presenting mechanism comprising a slide; a pair of pincers pivotally mounted on the slide at one side thereof, the jaws of said pincer members being provided with intermeshing connections; a second pair of pincers mounted upon the opposite side of said slide and likewise connected with intermeshing connections and being operatively connected through their pivot-pins with the first set of pincers; a pair of sliding jaws carried at the outer end of the second pair of pincers; a sector-gear mounted in the slide, said gear meshing with teeth formed upon the lower sliding jaw; a plate connected to the upper end of the shaft of the sector-gear, said plate being provided at its forward end with teeth meshing with a rack secured upon the upper sliding jaw; a shaft mounted upon the slide; a gear carried by said shaft and meshing with teeth formed upon the plate; and means for imparting an oscillating movement to the shaft.

39. In a welding machine, the combination of a series of clamping and welding jaws; blank-presenting mechanism comprising a slide arranged at one side of said jaws; a pair of pincers pivotally mounted on the slide at one side thereof, the jaws of said pincer members being provided with intermeshing connections; a second pair of pincers mounted upon the opposite side of said slide and likewise connected with intermeshing connections and being operatively connected through their pivot-pins with the first set of pincers; a pair of sliding jaws carried at the outer end of the second pair of pincers; a sector-gear mounted in the slide, said gear meshing with teeth formed upon the lower sliding jaw; a plate connected to the upper end of the shaft of the sector-gear, said plate being provided at its forward end with teeth meshing with a rack secured upon the upper sliding jaw; a shaft mounted upon the slide; a gear carried by said shaft and meshing with teeth formed upon the plate; and means for imparting an oscillating movement to the shaft.

40. In a welding machine, the combination of a plurality of clamping and welding jaws; means for presenting U-shaped blanks thereto; and a combined clamp and link-turner arranged in rear of one of the series of jaws, said clamp and turner being arranged to move the previously-formed link through a quarter of a revolution and to hold the same in position for the passage of one of the U-shaped blanks therethrough.

41. In a chain-welding machine, the combination of a plurality of clamping and welding jaws adapted and arranged to hold two U-shaped blanks; means for presenting the U-shaped blanks thereto; a pair of link-clamping jaws arranged in rear of the clamping and welding jaws; means acting upon the welded portions of the link while the same are being welded, to prevent undue formation of burs or enlargements; a pair of link-clamping jaws arranged in rear of the clamping and welding jaws; means for rotating said link-clamping jaws through a quarter of a revolution and thereby turning the previously-formed link from a horizontal to a vertical position; means for releasing said jaws; means for withdrawing the chain; and means for advancing the link-clamping jaws and again closing them upon the last-formed link.

42. In a chain-welding machine, the combination of a plurality of clamping and welding jaws adapted and arranged to hold two U-shaped blanks; a pair of link-clamping jaws arranged in rear of the clamping and welding jaws; means for rotating said link-clamping jaws through a quarter of a revolution and thereby turning the previously-formed link from a horizontal to a vertical position;

means for releasing said jaws; means for withdrawing the chain; and means for advancing the jaws and again closing them upon the last-formed link.

43. In a chain-welding machine, the combination of a plurality of clamping and welding jaws; means for presenting blanks thereto; and means located in rear of said jaws for properly positioning the previously-formed link, said means comprising a pair of pivoted jaws, means for bodily rotating said jaws, means for opening and closing said jaws, and means for moving said jaws toward and from the welding and clamping jaws.

44. In a chain-welding machine, the combination of a plurality of clamping and welding jaws; means for presenting blanks thereto; and means for properly positioning the previously-formed link to bring it into position for the passage of a blank therethrough, said means comprising a stationary barrel, a quill extending through said barrel, a sleeve mounted upon the quill, a pair of jaws pivoted upon said sleeve, means for oscillating the quill, means for advancing and retracting the sleeve upon which the jaws are pivoted, and means for opening and closing said jaws.

45. In a chain-welding machine, the combination of a plurality of clamping and welding jaws; means for presenting blanks thereto; and means for properly positioning the previously-formed link to bring it into position for the passage of a blank therethrough, said means comprising a stationary barrel, a quill extending through said barrel, a sleeve mounted upon the quill, a pair of jaws pivoted upon said sleeve, means for oscillating the quill, means for advancing and retracting the sleeve upon which the jaws are pivoted, a second sleeve mounted upon the outer face of the barrel and standing in line with the free ends of the jaws, and springs serving to open the jaws in opposition to the action of the sleeve.

46. In a chain-welding machine, the combination of a plurality of clamping and welding jaws; means for presenting blanks thereto; and means working in conjunction with said jaws to properly position the previously-formed link in order that one of the blanks may be fed therethrough, said means comprising a fixed barrel, a quill extending through said barrel, means for oscillating said quill, a sleeve slidably mounted on the inner end of said quill and rotatable therewith, a collar carried by the outer end of the quill, connections between said collar and sleeve, means for moving said sleeve back and forth upon the quill, a pair of jaws pivotally mounted upon the sleeve, a sleeve mounted upon the outer face of the barrel, said sleeve being provided with an inwardly-projecting collar arranged to act with the jaws to close the same, springs serving to open the jaws, and means for positioning said sleeve.

47. In a chain - welding machine, the combination of welding mechanism; means for withdrawing the chain step by step from said welding mechanism; a plurality of horizontally-disposed cutters arranged to act upon the opposite sides of the horizontally-disposed members of the chain-links; and a plurality of vertically - disposed cutters arranged to operate upon the opposite sides of the vertically-disposed members of the chain-links.

48. In a chain - welding machine, the combination of welding mechanism; means for withdrawing the completed chain therefrom step by step; a plurality of cutters arranged to act upon the opposite sides of the horizontally-disposed members of the links; clamps acting in conjunction with said cutters to hold the links; a plurality of cutters arranged to act upon the vertically-disposed members of the links; and clamps coöperating with said second set of cutters.

49. In a chain - welding machine, the combination of welding mechanism; means for withdrawing the completed chain therefrom step by step; a plurality of cutters arranged to act upon the straight portions of the links; an anvil arranged opposite each of said cutters; and clamps coacting with said anvils and cutters to grasp the links and hold the same while the cutters are operating.

50. In a chain - welding machine, the combination of welding mechanism; means for withdrawing the chain therefrom step by step; a plurality of cutters arranged to act upon opposite sides of the horizontally-disposed members of the links; an anvil arranged opposite each of said cutters; clamps embracing the opposite sides of the links; a second set of cutters arranged to act upon the vertically-disposed members of the links; an anvil arranged opposite each of said cutters; and clamping members arranged to clamp the links and hold the same in proper relation to the cutters and the anvils.

51. In a chain-welding machine, the combination of a series of stationary clamping jaws; a second series of jaws mounted upon a slide movable toward and from said first series of jaws; and adjustable means working in conjunction with said second series of jaws, arranged to break the welding circuit when said jaws have been moved forwardly toward the opposite jaws to a sufficient extent.

52. In a chain-welding machine, the combination of a series of relatively fixed clamping jaws; a slide; welding jaws carried by said slide; a local switch-opening circuit; and means carried by said slide for closing said circuit.

53. In a chain-welding machine, the combination of relatively-fixed welding jaws; a slide; welding jaws carried thereby; a local switch-opening circuit; and adjustable means carried by the slide for closing said circuit.

54. In a chain - welding machine, the combination of clamping and welding jaws; means acting on the welded portions of the link while it is being welded, to prevent the undue formation of burs or enlargements; and means acting subsequently to remove any excess material from the welded portion or portions of the link.

55. In a chain - welding machine, the combination of clamping and welding jaws; means acting on the welded portions of the link while it is being welded, to prevent the undue formation of burs or enlargements; a series of horizontally-disposed cutters; and a series of vertically-disposed cutters, said cutters being arranged to act upon the straight portions of the links and to remove any excess material therefrom.

56. In a chain - welding machine, the combination of clamping and welding jaws; mechanism for presenting thereto the blanks to be welded; means acting on the welded portions of the link while it is being welded, to prevent undue formation of burs or enlargements; means located in rear of the welding jaws for properly positioning and holding the last welded link; and means for withdrawing the finished chain step by step.

57. In a chain-welding machine, the combination of a plurality of clamping and welding jaws; mechanism for presenting thereto the blanks to be welded; means acting upon the welded portions of the link while it is being welded, to prevent undue formation of burs or enlargements; means for properly holding and positioning the last-formed link; means for withdrawing the chain step by step; and means for dressing the surfaces of the welded portions of the link.

In testimony whereof I have signed my name to this specification in the presence of two subscribing witnesses.

HANSON ROBINSON.

Witnesses:
 LEWIS D. SELL,
 HENRY J. KLUNK.